(12) United States Patent
Devenney et al.

(10) Patent No.: US 7,479,343 B2
(45) Date of Patent: Jan. 20, 2009

(54) PLATINUM-INDIUM-IRON/TUNGSTEN/ MANGANESE FUEL CELL ELECTROCATALYST

(75) Inventors: Martin Devenney, Mountain View, CA (US); Alexander Gorer, San Jose, CA (US); Peter Strasser, Mountain View, CA (US); Ting He, Dublin, OH (US); Hiroyuki Oyanagi, Utsunomiya (JP); Daniel M. Giaquinta, Mountain View, CA (US); Qun Fan, Fremont, CA (US); Konstantinos Chondroudis, Sunnyvale, CA (US)

(73) Assignees: Symyx Technologies, Inc., Santa Clara, CA (US); Honda Giken Kogyo Kabushiki Kaisha, Tokyo (JP)

(*) Notice: Subject to any disclaimer, the term of this patent is extended or adjusted under 35 U.S.C. 154(b) by 787 days.

(21) Appl. No.: 10/849,291

(22) Filed: May 19, 2004

(65) Prior Publication Data

US 2005/0037920 A1 Feb. 17, 2005
US 2006/0019825 A2 Jan. 26, 2006

Related U.S. Application Data

(60) Provisional application No. 60/473,565, filed on May 27, 2003.

(51) Int. Cl.
*H01M 4/86* (2006.01)
(52) U.S. Cl. .................. 429/40; 502/314; 502/313; 502/332; 502/326; 502/325; 502/324; 502/305
(58) Field of Classification Search .................. 429/40; 502/314, 313, 332, 326, 325, 324, 305
See application file for complete search history.

(56) References Cited

U.S. PATENT DOCUMENTS

| | | | |
|---|---|---|---|
| 4,217,205 A * | 8/1980 | Marcilly et al. | 502/228 |
| 5,876,867 A | 3/1999 | Itoh et al. | |
| 6,045,671 A | 4/2000 | Wu et al. | |
| 6,048,633 A | 4/2000 | Fujii et al. | |
| 6,127,058 A | 10/2000 | Pratt et al. | |
| 6,171,721 B1 | 1/2001 | Narayanan et al. | |
| 6,187,164 B1 | 2/2001 | Warren et al. | |
| 6,187,468 B1 | 2/2001 | Shinkai et al. | |
| 6,225,011 B1 | 5/2001 | Gotoh et al. | |
| 6,268,077 B1 | 7/2001 | Kelley et al. | |
| 6,294,280 B1 | 9/2001 | Tanaka et al. | |
| 6,511,593 B1 * | 1/2003 | Le Peltier et al. | 502/231 |
| 6,730,350 B2 | 5/2004 | Finkelshtain et al. | |

FOREIGN PATENT DOCUMENTS

EP 1080435 2/2002

(Continued)

OTHER PUBLICATIONS

Chu, D. et al.—Methanol Electro-oxidation on Unsupported Pt-Ru Alloys at Different Temperatures, Journal of the Electrochem. Soc., 1996, 143 (5), 1685-1690.

(Continued)

*Primary Examiner*—Laura S Weiner
(74) *Attorney, Agent, or Firm*—Senniger Powers LLP

(57) ABSTRACT

A fuel cell electrocatalyst that contains platinum, indium, and at least one of tungsten, iron, and manganese.

16 Claims, 3 Drawing Sheets

FOREIGN PATENT DOCUMENTS

| | | | |
|---|---|---|---|
| FR | 2509629 | * | 1/1983 |
| SU | 485165 | * | 9/1975 |
| WO | WO 99/16137 | | 4/1999 |

OTHER PUBLICATIONS

Ralph, T. et al.—Catalysis for Low Temp. Fuel Cells, Platinum Metals Rev., 2002, 46 (1), p. 3-14.

Strasser, P.—Combinatorial Electrochem. Tech. for the Discovery of New Fuel-Cell Cathode Materials, Direct Methanol Fuel Cells, Proceedings of the Electrochem. Soc., 2001, p. 191-208.

Strasser et al., Combinatorial Electrochemical Techniques for the Discovery of New Fuel-Cell Electrode Materials, Proceedings of the International Symposium on Fuel Cells for Vehicles, 41st Battery Symposium, The Electrochemical Society of Japan, Nagoya, 2000, pp. 34-35.

Schmidt et al.—Journal of The Electrochem. Soc., 1999, 146 (4), p. 1296-1304.

Schmidt et al.—Journal of the Electrochem. Soc., 1998, 145 (7), p. 2354-58.

* cited by examiner

PLATINUM-INDIUM-IRON/TUNGSTEN/ MANGANESE FUEL CELL ELECTROCATALYST

CROSS-REFERENCE TO RELATED APPLICATION

This application claims the benefit of U.S. Provisional Application No. 60/473,565, filed May 27, 2003, which is hereby incorporated by reference for all purposes.

BACKGROUND OF THE INVENTION

1. Field of the Invention

The present invention relates to electrocatalysts which are useful in fuel cell electrodes and other catalytic structures.

2. Description of Related Technology

A fuel cell is an electrochemical device for directly converting the chemical energy generated from an oxidation-reduction reaction of a fuel such as hydrogen or hydrocarbon-based fuels and an oxidizer such as oxygen gas (in air) supplied thereto into a low-voltage direct current. Thus, fuel cells chemically combine the molecules of a fuel and an oxidizer without burning, dispensing with the inefficiencies and pollution of traditional combustion.

A fuel cell is generally comprised of a fuel electrode (anode), an oxidizer electrode (cathode), an electrolyte interposed between the electrodes (alkaline or acidic), and means for separately supplying a stream of fuel and a stream of oxidizer to the anode and the cathode, respectively. In operation, fuel supplied to the anode is oxidized, releasing electrons that are conducted via an external circuit to the cathode. At the cathode, the supplied electrons are consumed when the oxidizer is reduced. The current flowing through the external circuit can be made to do useful work.

There are several types of fuel cells, including those having electrolytes of: phosphoric acid, molten carbonate, solid oxide, potassium hydroxide, and proton exchange membrane. A phosphoric acid fuel cell operates at about 160-220° C., and preferably at about 190-200° C. This type of fuel cell is currently being used for multi-megawatt utility power generation and for co-generation systems (i.e., combined heat and power generation) in the 50 to several hundred kilowatts range.

In contrast, proton exchange membrane fuel cells use a solid proton-conducting polymer membrane as the electrolyte. Typically, the polymer membrane is maintained in a hydrated form during operation in order to prevent loss of ionic conduction which limits the operation temperature typically to between about 70 and about 120° C. depending on the operating pressure, and preferably below about 100° C. Proton exchange membrane fuel cells have a much higher power density than liquid electrolyte fuel cells (e.g., phosphoric acid), and can vary output quickly to meet shifts in power demand. Thus, they are suited for applications such as in automobiles and small-scale residential power generation where quick startup is a consideration.

In some applications (e.g., automotive) pure hydrogen gas is the optimum fuel; however, in other applications where a lower operational cost is desirable, a reformed hydrogen-containing gas is an appropriate fuel. A reformed-hydrogen containing gas is produced, for example, by steam-reforming methanol and water at 200-300° C. to a hydrogen-rich fuel gas containing carbon dioxide. Theoretically, the reformate gas consists of 75 vol % hydrogen and 25 vol % carbon dioxide. In practice, however, this gas also contains nitrogen, oxygen, and, depending on the degree of purity, varying amounts of carbon monoxide (up to 1 vol %). Although some electronic devices also reform liquid fuel to hydrogen, in some applications the conversion of a liquid fuel directly into electricity is desirable, as then a high storage density and system simplicity are combined. In particular, methanol is an especially desirable fuel because it has a high energy density, a low cost, and is produced from renewable resources.

For the oxidation and reduction reactions in a fuel cell to proceed at useful rates, especially at operating temperatures below about 300° C., electrocatalyst materials are typically provided at the electrodes. Initially, fuel cells used electrocatalysts made of a single metal, usually platinum (Pt), palladium (Pd), rhodium (Rh), iridium (Ir), osmium (Os), silver (Ag) or gold (Au) because they are able to withstand the corrosive environment—platinum being the most efficient and stable single-metal electrocatalyst for fuel cells operating below about 300° C. While these elements were first used in fuel cells in metallic powder form, later techniques were developed to disperse these metals over the surface of electrically conductive supports (e.g., carbon black) to increase the surface area of the electrocatalyst which in turn increased the number of reactive sites leading to improved efficiency of the cell. Nevertheless, fuel cell performance typically declines over time because the presence of electrolyte, high temperatures and molecular oxygen dissolve the electrocatalyst and/or sinter the dispersed electrocatalyst by surface migration or dissolution/re-precipitation.

Although platinum is the most efficient and stable single-metal electrocatalyst for fuel cells, it is costly and an increase in electrocatalyst activity over platinum is necessary for wide scale commercialization of fuel cell technology. The development of cathode fuel cell electrocatalyst materials faces longstanding challenges. The greatest challenge is the improvement of the electrode kinetics of the oxygen reduction reaction. In fact, sluggish electrochemical reaction kinetics have prevented attaining the thermodynamic reversible electrode potential for oxygen reduction. This is reflected in exchange current densities of around $10^{-11}$ to $10^{-12}$ $A/cm^2$ for oxygen reduction on, for example, Pt at low and medium temperatures. A factor contributing to this phenomenon includes the fact that the desired reduction of oxygen to water is a four-electron transfer reaction and typically involves breaking a strong O—O bond early in the reaction. In addition, the open circuit voltage is lowered from the thermodynamic potential for oxygen reduction due to the formation of peroxide and possible platinum oxides that inhibit the reaction. A second challenge is the stability of the oxygen electrode (cathode) during long-term operation. Specifically, a fuel cell cathode operates in a regime in which even the most unreactive metals are not completely stable. Thus, alloy compositions that contain non-noble metal elements may have a rate of corrosion that would negatively impact the projected lifetime of a fuel cell. The corrosion may be more severe when the cell is operating near open circuit conditions (which is the most desirable potential for thermodynamic efficiency).

Electrocatalyst materials at the anode also face challenges during fuel cell operation. Specifically, as the concentration of carbon monoxide (CO) rises above about 10 ppm in the fuel the surface of the electrocatalyst can be rapidly poisoned. As a result, platinum (by itself) is a poor electrocatalyst if the fuel stream contains carbon monoxide (e.g., reformed-hydrogen gas typically exceeds 100 ppm). Liquid hydrocarbon-based fuels (e.g., methanol) present an even greater poisoning problem. Specifically, the surface of the platinum becomes blocked with the adsorbed intermediate, carbon monoxide (CO). It has been reported that $H_2O$ plays a key role in the removal of such poisoning species in accordance with the following reactions:

$$Pt+CH_3OH \rightarrow Pt-CO+4H^++4e^- \quad (1);$$

$$Pt+H_2O \rightarrow Pt-OH+H^++e^- \quad (2); \text{ and}$$

$$Pt-CO+Pt-OH \rightarrow 2Pt+CO_2+H^++e^- \quad (3).$$

As indicated by the foregoing reactions, the methanol is adsorbed and partially oxidized by platinum on the surface of the electrode (1). Adsorbed OH, from the hydrolysis of water, reacts with the adsorbed CO to produce carbon dioxide and a proton (2,3). However, platinum does not form OH species well at the potentials fuel cell electrodes operate (e.g., 200 mV-1.5 V). As a result, step (3) is the slowest step in the sequence, limiting the rate of CO removal, thereby allowing poisoning of the electrocatalyst to occur. This applies in particular to a proton exchange membrane fuel cell which is especially sensitive to CO poisoning because of its low operating temperatures.

One technique for increasing electrocatalytic cathodic activity during the reduction of oxygen and electrocatalytic anodic activity during the oxidation of hydrogen is to employ an electrocatalyst which is more active, corrosion resistant, and/or more poison tolerant. For example, increased tolerance to CO has been reported by alloying platinum and ruthenium at a 50:50 atomic ratio (see, D. Chu and S. Gillman, J. Electrochem. Soc. 1996, 143, 1685). The electrocatalysts proposed to date, however, leave room for further improvement.

BRIEF SUMMARY OF THE INVENTION

Briefly, therefore, the present invention is directed to a catalyst for use in oxidation or reduction reactions, the catalyst comprising platinum, indium, and at least one of tungsten, iron, and manganese.

The present invention is also directed to a supported electrocatalyst powder for use in electrochemical reactor devices, the supported electrocatalyst powder comprising a catalyst comprising platinum, indium, and at least one of tungsten, iron, and manganese and electrically conductive support particles upon which the catalyst is dispersed.

The present invention is also directed to a fuel cell electrode, the fuel cell electrode comprising electrocatalyst particles and an electrode substrate upon which the electrocatalyst particles are deposited, the electrocatalyst particles comprising a catalyst comprising platinum, indium, and at least one of tungsten, iron, and manganese.

The present invention is also directed to a fuel cell comprising an anode, a cathode, a proton exchange membrane between the anode and the cathode, and a catalyst comprising platinum, indium, and at least one of tungsten, iron, and manganese for the catalytic oxidation of a hydrogen-containing fuel or the catalytic reduction of oxygen.

The present invention is also directed to a method for the electrochemical conversion of a hydrogen-containing fuel and oxygen to reaction products and electricity in a fuel cell comprising an anode, a cathode, a proton exchange membrane therebetween, a catalyst comprising platinum, indium, and at least one of tungsten, iron, and manganese, and an electrically conductive external circuit connecting the anode and cathode, the method comprising contacting the hydrogen-containing fuel or the oxygen and the catalyst to catalytically oxidize the hydrogen-containing fuel or catalytically reduce the oxygen.

The present invention is also directed to an unsupported catalyst layer on a surface of an electrolyte membrane or an electrode, said unsupported catalyst layer comprising platinum, indium, and at least one of tungsten, iron, and manganese.

The foregoing and other features and advantages of the present invention will become more apparent from the following description and accompanying figures.

BRIEF DESCRIPTION OF THE DRAWINGS

It is to be noted that corresponding reference characters indicate corresponding parts throughout the drawings.

DETAILED DESCRIPTION OF THE INVENTION

General Discussion

Figure 1:
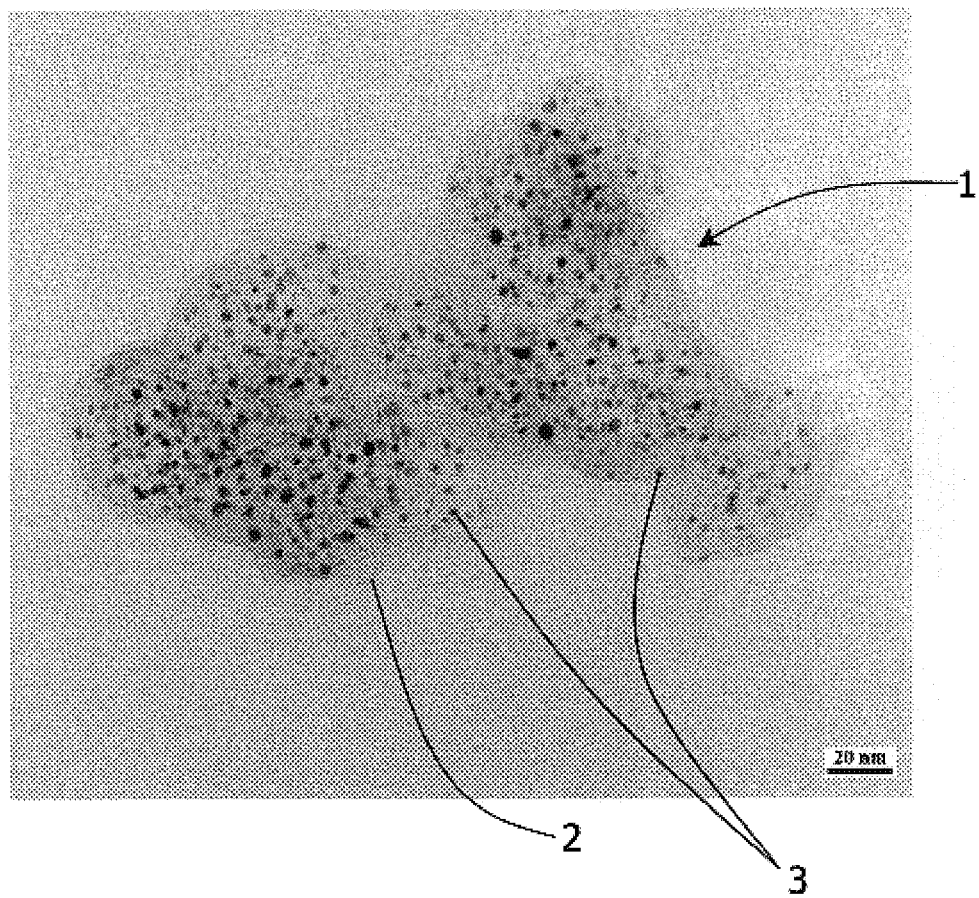
FIG. 1 is a photograph of a TEM image of a carbon support with alloy nanoparticles deposited thereon, in accordance with the present invention.

The present invention is directed to a metal-containing substance having electrocatalytic activity for use in, for example, polyelectrolyte membrane fuel cell (e.g., an electrocatalyst). In one embodiment the metal-containing substance is an alloy of the components. However, it is to be noted that the substance (e.g., electrocatalyst) may be a mixture of discrete amounts of the components (e.g., a mixture of metal powders or a mixture of deposits), wherein a discrete amount of the components may comprise a single component or a combination of components (e.g., an alloy).

In general, it is desirable, but not essential, to reduce the cost of an electrocatalyst and one method of doing so is to decrease the amount of noble metals (especially platinum) used to produce the electrocatalyst. Typically, however, as the concentrations of noble metals are decreased electrocatalyst compositions tend to become more susceptible to corrosion and/or the absolute activity may be diminished. Thus, it is typically desirable to achieve the most activity per weight percent of noble metals (see, e.g., end current density/weight fraction of platinum as set forth in Tables A-F, infra). Preferably, this is accomplished without compromising, for example, the life cycle of the fuel cell in which the electrocatalyst is placed. In addition to, or as an alternative to, reducing cost by limiting the noble metal concentration, an electrocatalyst composition of the present invention may be selected because it represents an improvement in corrosion resistance and/or activity compared to platinum (e.g., at least a 3 times increase in electrocatalytic activity compared to platinum).

The present invention is thus directed to a metal-containing substance, preferably an alloy, that comprises platinum, indium, and at least one of tungsten, iron, and manganese. Furthermore, the catalyst of the present invention comprises amounts of platinum, indium, and at least one of tungsten, iron, and manganese which are sufficient for the metals, present therein, to play a role in the catalytic activity or crystallographic structure of the catalyst or alloy. Stated another way, the concentrations of platinum, indium, and at least one of tungsten, iron, and manganese are such that the presence of the metals would not be considered an impurity. For example, when present, the concentrations of each of platinum, indium, and at least one of tungsten, iron, and manganese are at least about 0.1, 0.5, 1, or even 2 atomic percent. Advantageously and surprisingly, it has been discovered that certain catalyst compositions comprising platinum, indium, and at least one of tungsten, iron, and manganese (e.g., alloys) having reduced amounts of platinum (as compared to, for example, a platinum standard) are electrocatalytically active (e.g., enabling the reduction of oxygen at a fuel cell cathode).

In one or more embodiments the platinum, indium, and at least one of tungsten, iron, and manganese are substantially in their metallic oxidation states. Stated another way, the average oxidation states of the foregoing catalyst elements are at or near zero. Although there may be portions of the catalyst wherein the oxidation states of one or more of platinum, indium, and at least one of tungsten, iron, and manganese is greater than zero, the average oxidation state of each of these elements throughout the entire catalyst is less than the lowest commonly occurring oxidation state for that particular element (e.g., the lowest commonly occurring oxidation state for platinum, indium, tungsten, iron, and manganese is 2). Therefore, the average oxidation states of the platinum, indium, and at least one of tungsten, iron, and manganese may, in order of increasing preference, be less than 1, 0.5, 0.1, or 0.01, or even zero.

It is to be noted that the catalyst may consist essentially of the platinum, indium, and at least one of tungsten, iron, and manganese (e.g., impurities that play little if any role in the catalytic activity and/or crystallographic structure of the catalyst may be present to some degree). Stated another way, the concentration of a metallic or non-metallic element other than platinum, indium, and at least one of tungsten, iron, and manganese does not exceed what would be considered an impurity (e.g., less than 1, 0.5, 0.1, 0.01 atomic percent, or less).

Constituent Concentrations

As previously disclosed, the catalyst composition of the present invention comprises platinum. Preferably, the catalyst comprises at least about 5 atomic percent of platinum. More preferably, the concentration of platinum is at least about 10 atomic percent. At the other end of the platinum concentration range, it is generally preferred that the cost of the catalyst is controlled, at least in part, by selecting a concentration of platinum that is less than about 95, 90, 85, 80, 75, or 70 atomic percent. More preferably, the concentration of platinum does not exceed about 65 atomic percent. Still more preferably, the concentration of platinum does not exceed about 50 atomic percent. Accordingly, the concentration of platinum may, in some embodiments, be between a minimum platinum concentration and a maximum platinum concentration, wherein the minimum platinum concentration is selected from the group consisting of about 5 and about 10 atomic percent, and the maximum platinum concentration is selected from the group consisting of about 65 and about 50 atomic percent. Preferably, the concentration of platinum is between about 5 and about 65 atomic percent. More preferably, the concentration of platinum is between about 10 and about 50 atomic percent. It is to be noted, however, that the scope of the present invention is intended to encompass all of the various concentration range permutations possible herein.

Like platinum, the concentration of indium may also be varied widely in the many embodiments disclosed herein. Preferably, the concentration of indium is at least about 5 atomic percent. More preferably, the concentration of indium is at least about 10 atomic percent. On the other hand, the concentration of indium is, in order of increasing preference, no more than about 95, 90, 85, or 80 atomic percent. In some embodiments (see, e.g., Pt—In—Mn alloy electrocatalyst compositions and Table D, below) the concentration of indium is preferably relatively high (e.g., between about 50 and about 70 atomic percent, or about 55 and about 65 atomic percent). In other embodiments (see, e.g., Pt—In—W alloy electrocatalyst compositions and Table A, below) the concentration of indium is preferably no more than about 50 atomic percent, and more preferably no more than about 40 atomic percent. Accordingly, the concentration of indium may, in some embodiments, be between about 5 and about 80 atomic percent, between about 5 and about 50 atomic percent, or between about 10 and about 40 atomic percent.

The sum of the concentrations of the any one of tungsten, iron, and manganese may be varied through a range that is significantly larger than that of platinum or indium. Preferably, the sum of the concentrations of tungsten, iron, and manganese is at least about 10 atomic percent. More preferably, the sum of the concentrations of these elements is at least about 20 atomic percent. Preferably, the sum of the concentrations of tungsten, iron, and manganese is no more than about 85 atomic percent. More preferably, the sum of the concentrations of these elements is no more than about 70 atomic percent. Accordingly, the sum of the concentrations of the tungsten, iron, and manganese may, in some embodiments, be between about 10 and about 85 atomic percent or between about 10 and about 40 atomic percent. It is to be noted, however, that the scope of the present invention is intended to encompass all of the various concentration range permutations possible herein.

It is to be further noted that the metal-containing substance of the present invention may encompass any of the various combinations of platinum, indium, and at least one of tungsten, iron, and manganese concentrations and/or ranges of concentrations set forth above without departing from its intended scope. For example, in one embodiment the catalyst comprises a concentration of platinum that is between about 5 and about 60 atomic percent, a concentration of indium that is between about 5 and about 50 atomic percent, and a concentration of tungsten, iron, manganese, or a combination thereof that is between about 10 and about 85 atomic percent. Preferably, the catalyst comprises a concentration of platinum that is between about 10 and about 50 atomic percent, a concentration of indium that is between about 10 and about 40 atomic percent, and a concentration of tungsten, iron, manganese, or a combination thereof that is between about 20 and about 70 atomic percent.

Additionally, the catalyst may consist essentially of platinum, indium, and at least one of tungsten, iron, and manganese. Furthermore, the concentrations of the metals may be within any one or more of the foregoing ranges for an individual metal or for the combination of metals.

Pt—In—W Alloy Electrocatalyst Compositions

In addition to the platinum and indium, the activity and stability of the catalyst depends, at least in part, on the selection of the one or more of tungsten, iron, and manganese. In one embodiment of the present invention the catalyst comprises platinum, indium, and tungsten. The concentration of each constituent may be varied throughout a range. For example, the concentration of platinum may be between about 10 and about 30 atomic percent, or between about 15 and about 25 atomic percent; alternatively, it may be between about 50 and about 60 atomic percent. Similarly, the concentration of indium may be between about 5 and about 30 atomic percent, between about 5 and about 25 atomic percent, or between about 20 and about 30 atomic percent. The concentration of tungsten may be between about 40 and about 80 atomic percent, or between about 55 and about 75 atomic percent; alternatively, it may be between about 15 and about 25 atomic percent.

Additionally, the activity and stability of the catalyst depends, at least in part, on the concentrations of the constituents (e.g., the platinum, indium, and tungsten) relative to each other. For example, in one sub-embodiment, catalyst compositions with desirable levels of activity, stability, or both have been found to comprise platinum at a concentration that is between about 10 and about 30 atomic percent, indium at a concentration that is between about 5 and about 30 atomic percent, and tungsten at a concentration that is between about 40 and about 80 atomic percent. In a second sub-embodiment the concentration of platinum is between about 15 and about 25 atomic percent, the concentration of indium is between about 5 and about 25 atomic percent, and the concentration of tungsten is between about 55 and about 75 atomic percent. In a third sub-embodiment the concentration of platinum is between about 50 and about 60 atomic percent, the concentration of indium is between about 20 and about 30 atomic percent, and the concentration of tungsten is between about 15 and about 25 atomic percent.

The catalyst may alternatively consists essentially of platinum, indium, and tungsten. Furthermore, the concentrations of these metals may correspond any of the foregoing ranges or embodiments.

Pt—In—Fe Alloy Electrocatalyst Compositions

In another embodiment of the present invention the catalyst comprises platinum, indium, and iron. The concentration of each constituent may be varied throughout a range. For example, the concentration of platinum may be between about 25 and about 65 atomic percent, between about 30 and about 50 atomic percent, or between about 30 and about 40 atomic percent. Similarly, the concentration of indium may be between about 5 and about 50 atomic percent, between about 15 and about 45 atomic percent, or between about 20 and about 30 atomic percent. The concentration of iron may be between about 10 and about 60 atomic percent, between about 15 and about 50 atomic percent, or between about 20 and about 30 atomic percent.

Additionally, it has been discovered that activity, stability, or a combination of the two is affected by the relative concentrations of the various metals. For example, in one sub-embodiment, catalyst compositions with desirable levels of activity, stability, or both have been found to comprise platinum at a concentration that is between about 25 and about 65 atomic percent, indium at a concentration that is between about 5 and about 50 atomic percent, and iron at a concentration that is between about 10 and about 60 atomic percent. In a second sub-embodiment the concentration of platinum is between about 30 and about 50 atomic percent, the concentration of indium is between about 15 and about 45 atomic percent, and the concentration of iron is between about 15 and about 50 atomic percent. In a third sub-embodiment the concentration of platinum is between about 45 and about 55 atomic percent, the concentration of indium is between about 20 and about 30 atomic percent, and the concentration of iron is between about 20 and about 30 atomic percent.

The catalyst may alternatively consists essentially of platinum, indium, and iron. Furthermore, the concentrations of these metals may correspond any of the foregoing ranges or embodiments.

Pt—In—Fe—Mn Alloy Electrocatalyst Compositions

In another embodiment of the present invention the catalyst comprises platinum, indium, iron, and manganese. The concentration of each constituent may be varied throughout a range. For example, the concentration of platinum may be between about 10 and about 50 atomic percent, or between about 30 and about 45 atomic percent. Similarly, the concentration of indium may be between about 5 and about 30 atomic percent, or between about 15 and about 30 atomic percent. The concentration of iron may be between about 15 and about 80 atomic percent, or between about 20 and about 45 atomic percent. The concentration of manganese may be between about 1 and about 15 atomic percent, or between about 3 and about 12 atomic percent.

Additionally, it has been discovered that activity, stability, or a combination of the two is affected by the relative concentrations of the various metals. For example, in one sub-embodiment, catalyst compositions with desirable levels of activity, stability, or both have been found to comprise platinum at a concentration that is between about 10 and about 50 atomic percent, indium at a concentration that is between about 5 and about 30 atomic percent, iron at a concentration that is between about 15 and about 80 atomic percent, and manganese at a concentration that is between about 1 and about 15 atomic percent. In a second sub-embodiment the concentration of platinum is between about 30 and about 45 atomic percent, the concentration of indium is between about 15 and about 30 atomic percent, the concentration of iron is between about 20 and about 45 atomic percent, and the concentration of manganese is between about 3 and about 12 atomic percent.

The catalyst may alternatively consists essentially of platinum, indium, iron, and manganese. Furthermore, the concentrations of these metals may correspond any of the foregoing ranges or embodiments.

Pt—In—Mn Alloy Electrocatalyst Compositions

In another embodiment of the present invention the catalyst comprises platinum, indium, and manganese. The concentration of each constituent may be varied throughout a range. For example, the concentration of platinum may be between about 10 and about 50 atomic percent, between about 15 and about 45 atomic percent, between about 20 and about 40 atomic percent, or between about 25 and about 35 atomic percent. The concentration of indium may be between about 10 and about 80 atomic percent, between about 30 and about 75 atomic percent, between about 40 and about 70 atomic percent, or between about 50 and about 70 atomic percent. The concentration of manganese may be no more than about 60 atomic percent, or no more than about 50 atomic percent, the concentration ranging for example from between about 5 and about 40 atomic percent, or between about 10 and about 30 atomic percent.

Additionally, it has been discovered that activity, stability, or a combination of the two is affected by the relative concentrations of the various metals. For example, in one sub-embodiment, catalyst compositions with desirable levels of activity, stability, or both have been found to comprise platinum at a concentration that is between about 10 and about 50 atomic percent, indium at a concentration that is between about 10 and about 80 atomic percent, and manganese at a concentration that is no more than about 60 atomic percent. In a second sub-embodiment the concentration of platinum is between about 15 and about 45 atomic percent, the concentration of indium is between about 30 and about 75 atomic percent, and the concentration of manganese is no more than about 50 atomic percent. In a third sub-embodiment the concentration of platinum is between about 20 and about 40 atomic percent, the concentration of indium is between about 40 and about 70 atomic percent, and the concentration of manganese is between about 5 and about 40 atomic percent. In a forth sub-embodiment the concentration of platinum is between about 25 and about 35 atomic percent, the concentration of indium is between about 50 and about 70 atomic percent, and the concentration of manganese is between about 10 and about 30 atomic percent.

The catalyst may alternatively consists essentially of platinum, indium, and manganese. Furthermore, the concentrations of these metals may correspond any of the foregoing ranges or embodiments.

Pt—In—W—Mn Alloy Electrocatalyst Compositions

In another embodiment of the present invention the catalyst comprises platinum, indium, tungsten, and manganese. The concentration of each constituent may be varied throughout a range. For example, the concentration of platinum may be between about 25 and about 65 atomic percent, between about 30 and about 60 atomic percent, or between about 35 and about 55 atomic percent. The concentration of indium may be no more than about 55 atomic percent, ranging from example from between about 5 and about 50 atomic percent, or between about 10 and about 40 atomic percent. The concentration of tungsten may be no more than about 40 atomic percent, ranging for example from between about 5 and about 35 atomic percent, or between about 10 and about 30 atomic percent. The concentration of manganese may be no more than about 40 atomic percent, ranging for example from between about 5 and about 35 atomic percent, or between about 10 and about 30 atomic percent.

Additionally, it has been discovered that activity, stability, or a combination of the two is affected by the relative concentrations of the various metals. For example, in one sub-embodiment, catalyst compositions with desirable levels of activity, stability, or both have been found to comprise platinum at a concentration that is between about 25 and about 65 atomic percent, indium at a concentration that is no more than about 55 atomic, tungsten at a concentration that is no more than about 40 atomic percent, and manganese at a concentration that is no more than about 40 atomic percent. In a second sub-embodiment the concentration of platinum is between about 30 and about 60 atomic percent, the concentration of indium is between about 5 and about 50 atomic percent, the concentration of tungsten is between about 5 and about 35 atomic percent, and the concentration of manganese is between about 5 and about 35 atomic percent. In a third sub-embodiment the concentration of platinum is between about 35 and about 55 atomic percent, the concentration of indium is between about 10 and about 40 atomic percent, the concentration of tungsten is between about 10 and about 30 atomic percent, and the concentration of manganese is between about 10 and about 30 atomic percent.

The catalyst may alternatively consist essentially of platinum, indium, tungsten, and manganese. Furthermore, the concentrations of these metals may correspond any of the foregoing ranges or embodiments.

It is to be noted that all of the foregoing alloy compositions of the present invention are the overall stoichiometries, or bulk stoichiometries, of a prepared electrocatalyst prior to being subjected to an electrocatalytic reaction. That is, a reported alloy composition is an average stoichiometry over the entire volume of the prepared electrocatalyst composition, and therefore, localized stoichiometric variations may exist. For example, the volume of an electrocatalyst alloy particle comprising the surface and the first few atomic layers inward therefrom may differ from the bulk stoichiometry. Likewise, within the bulk of the particle there may be stoichiometric variations. The surface stoichiometry corresponding to a particular bulk stoichiometry is highly dependant upon the method and conditions under which the electrocatalyst alloy is prepared and alloys having the same bulk stoichiometry may have significantly different surface stoichiometries. Without being bound to a particular theory, it is believed the differing surface stoichiometries are due at least in part to differences in the atomic arrangements, chemical phases and homogeneity of the electrocatalysts.

Furthermore, it is to be noted that it has been reported that subjecting an electrocatalyst composition to an electrocatalytic reaction (e.g., the operation of a fuel cell) may change the composition by leaching one or more alloy constituents from the alloy (see, Catalysis for Low Temperature Fuel Cells Part 1: The Cathode Challenges, T. R. Ralph and M. P. Hogarth, Platinum Metals Rev., 2002, 46, (1), p. 3-14). This leaching effect may potentially act to increase the activity of the electrocatalyst by increasing the surface area and/or by changing the surface composition of the electrocatalyst. In fact, the purposeful leaching of electrocatalyst compositions after synthesis to increase the surface area has been disclosed by Itoh et al. (see, e.g., U.S. Pat. No. 5,876,867). As such, it is to be noted that the alloy compositions of the present invention are intended to include starting bulk stoichiometries, any starting surface stoichiometries resulting therefrom, and modifications of the starting bulk and/or surface stoichiometries that are produced by subjecting the electrocatalyst to an electrocatalytic reaction.

Formation of an Electrocatalyst Alloy

The electrocatalyst alloys of the present invention may be formed by a variety of methods. For example, the appropriate amounts of the constituents may be mixed together and heated to a temperature above the respective melting points to form a molten solution of the metals that is cooled and allowed to solidify. Typically, electrocatalysts are used in a powder form to increase the surface area which increases the number of reactive sites and leads to improved efficiency of the cell. Thus, the formed metal alloy may be transformed into a powder after being solidified (e.g., by grinding) or during solidification (e.g., spraying molten alloy and allowing the droplets to solidify). It may, however, be advantageous to evaluate alloys for electrocatalytic activity in a non-powder form (see, e.g., Examples 1 and 2, infra).

To further increase surface area and efficiency, an electrocatalyst alloy for use in a fuel cell may be deposited over the surface of electrically conductive supports (e.g., carbon black). One method for loading an electrocatalyst alloy onto supports typically comprises depositing metal precursor compounds onto the supports, and converting the precursor compounds to metallic form and alloying the metals using a heat-treatment in a reducing atmosphere (e.g., an atmosphere comprising an inert gas such as argon). One method for depositing the precursor compounds involves chemical precipitation of precursor compounds onto the supports. The chemical precipitation method is typically accomplished by mixing supports and sources of the precursor compounds (e.g., an aqueous solution comprising one or more inorganic metal salts) at a concentration sufficient to obtain the desired loading of the electrocatalyst on the supports after which precipitation of the precursor compounds is initiated (e.g., by adding an ammonium hydroxide solution). The slurry is then typically filtered from the liquid under vacuum, washed with deionized water, and dried to yield a powder that comprises the precursor compounds on the supports.

Another method for depositing the precursor compounds comprises forming a suspension comprising a solution and supports suspended therein, wherein the solution comprises a solvent portion and a solute portion that comprises the constituents of the precursor compound(s) being deposited. The suspension is frozen to deposit (e.g., precipitate) the precursor compound(s) on the particles. The frozen suspension is freeze-dried to remove the solvent portion and leave a freeze-dried powder comprising the supports and the deposits of the precursor compound(s) on the supports.

The solution in which the supports are dispersed/suspended provides the means for delivering the metal species which is to be deposited onto the surfaces of the supports. The metal species may be the final desired form, but in many instances it is not. If the metal species is not a final desired form, the deposited metal species is a precursor of the final desired form. Examples of such precursors or metal species include inorganic and organic metal compounds such as metal halides, sulfates, carbonates, nitrates, nitrites, oxalates, acetates, formates, etc. The conversion to the final desired form may be made by thermal decomposition, chemical reduction, or other reaction. Thermal decomposition, for example, is brought about by heating a precursor to obtain a different solid material and a gaseous material. In general, as is known, thermal decomposition of halides, sulfates, carbonates, nitrates, nitrites, oxalates, acetates, and formates may be carried out at temperatures between about 200 and about 1,200° C.

Since the process may involve sublimation of the solvent portion from the frozen suspension, the solvent portion of the solution in which the supports are suspended preferably has an appreciable vapor pressure below its freezing point. Examples of such sublimable solvents that also dissolve many metal-containing compounds and metals include water, alcohols (e.g., methanol, ethanol, etc.), acetic acid, carbon tetrachloride, ammonia, 1,2 dichloroethane, N,N-dimethyl-formamide, formamide, etc.

A precursor is usually selected such that any unwanted by-products from the conversion can be removed from the powder product. For example, during thermal decomposition the unwanted decomposition products are typically volatilized. To yield a final product that is an electrocatalyst metal alloy, the metal precursors are typically selected so that the powder comprising the deposited precursors may be reduced without significantly altering the uniformity of the metal deposits on the surface of the supports and/or without significantly altering the particle size of the final powder (e.g., through agglomeration).

Nearly any metal may be deposited onto supports by one or more of the processes noted herein, provided that the metal or compound containing the metal is capable of being dispersed or dissolved in a suitable medium (i.e., a solvent). Likewise, nearly any metal may be combined with, or alloyed with, any other metal provided the metals or metal-containing compounds are dispersible or soluble in a suitable medium.

The solute portion may comprise an organometallic compound and/or an inorganic metal-containing compound as a source of the metal species being deposited. In general, organometallic compounds are more costly, contain more impurities than inorganic metal-containing compounds, and require organic solvents. Organic solvents are more costly than water and typically require procedures and/or treatments to control purity or negate toxicity. As such, organometallic compounds and organic solvents are generally not preferred. Examples of appropriate inorganic salts include indium (III) nitrate pentahydrate, $(NH_4)_{10}W_{12}O_{41} \cdot 5H_2O$, iron (III) nitrate nonahydrate, and manganese (II) nitrate. The foregoing compound is highly soluble in water; in this embodiment water is the preferred solvent. In some instances, it is desirable for an inorganic metal-containing compound to be dissolved in an acidic solution prior to being mixed with other inorganic metal-containing compounds.

To form an alloy having a particular composition or stoichiometry, the amounts of the various metal-containing source compounds necessary to achieve that composition are determined. If the supports have a pre-deposited metal, the loading of the pre-deposited metal on the supports is typically taken into account when calculating the necessary amounts of metal-containing source compounds. After the appropriate amounts of the metal-containing compounds are determined, the solution may be prepared by any appropriate method. For example, if all the selected metal-containing source compounds are soluble at the desired concentration in the same solvent at room temperature, they may merely be mixed with the solvent. Alternatively, the suspending solution may be formed by mixing source solutions, wherein a source solution comprises a particular metal-containing source compound at a particular concentration. If, however, all the selected compounds are not soluble at the same temperature when mixed together (either as powders into the solvent or as source solutions), the temperature of the mixture may be increased to increase the solubility limit of one or more of the source compounds so that the suspending solution may be formed. In addition to adjusting solubility with temperature, the stability of the suspending solution may be adjusted, for example, by the addition of a buffer, by the addition of a complexing agent, and/or by adjusting the pH.

In addition to varying the amounts of the various metals to form alloys having different compositions, this method allows for a wide variation in the loading of the metal onto the supports. This is beneficial because it allows for the electrocatalytic activity of a supported metal alloy powder to be maximized. The loading is controlled in part by adjusting the total concentration of the various metals in the solution while maintaining the relative amounts of the various metals. In fact, the concentrations of the inorganic metal-containing compounds may approach the solubility limit for the solution. Typically, however, the total concentration of inorganic metal-containing compounds in the solution is between about 0.01 and about 5 M which is well below the solubility limit. In one embodiment the total concentration of inorganic metal-containing compounds in the solution is between about 0.1 and about 1 M. Concentrations below the solubility limit are used because it is desirable to maximize the loading of the supported metal alloy electrocatalysts without decreasing the surface area of the metal deposits. Depending, for example, on the particular composition, the size of the deposits, and the uniformity of the deposit distribution on the supports, this maximized condition is typically achieved at a loading between about 5 and about 60 weight percent. In one embodiment the loading is between about 15 and about 45 weight percent, or between about 20 and 40 weight percent. In another embodiment the loading is about 20 weight percent, or about 40 weight percent.

The supports upon which the metal species is to be deposited may be of any size and composition that is capable of being dispersed/suspended in the solution during the removal of heat to precipitate the metal species. The maximum size depends on several parameters including agitation of the suspension, density of the supports, specific gravity of the solution, and the rate at which heat is removed from the system. In general, the supports are electrically conductive and are useful for supporting electrocatalytic compounds in fuel cells. Such electrically conductive supports are typically inorganic, for example, carbon supports. However, the electrically conductive supports may comprise an organic material such as an electrically conductive polymer (see, e.g., in U.S. Pat. No. 6,730,350). Carbon supports may be predominantly amorphous or graphitic and they may be prepared commercially, or specifically treated to increase their graphitic nature (e.g., heat treated at a high temperature in vacuum or in an inert gas atmosphere) thereby increasing corrosion resistance. Carbon black support particles may have a Brunauer, Emmett and Teller (BET) surface area up to about 2000 $m^2/g$. It has been reported that satisfactory results are achieved using carbon black support particles having a high mesoporous area, e.g., greater than about 75 $m^2/g$ (see, e.g., Catalysis for Low Temperature Fuel Cells Part 1: The Cathode Challenges, T. R. Ralph and M. P. Hogarth, Platinum Metals Rev., 2002, 46, (1), p. 3-14). Experimental results to date indicate that a surface area of about 500 $m^2/g$ is preferred.

In another embodiment the supports have pre-deposited material thereon. For example, when the final composition of the deposits on the carbon supports is a platinum alloy, it may be advantageous to use a carbon supported platinum powder. Such powders are commercially available from companies such as Johnson Matthey, Inc., of New Jersey and E-Tek Div. of De-Nora, N.A., Inc., of Somerset, N.J. and may be selected to have a particular loading of platinum. The amount of platinum loading is selected in order to achieve the desired stoichiometry of the supported metal alloy. Typically, the loading of platinum is between about 5 and about 60 weight percent. In one embodiment the loading of platinum is between about 15 and 45 weight percent. The size (i.e., the maximum cross-sectional length) of the platinum deposits is typically less than about 20 nm. In other embodiments of the invention the size of the platinum deposits is less than about 10 nm, 5 nm, or 2 nm, and may be smaller. In another embodiment of the invention the size of the platinum deposits is between about 2 and about 3 nm. Experimental results to date indicate that a desirable supported platinum powder may be further characterized by having a platinum surface area of between about 150 and about 170 $m^2/g$ (determined by CO adsorption), a combined carbon and platinum surface area between about 350 and about 400 $m^2/g$ (determined by $N_2$ adsorption), and an average support size that is between about 100 and 300 nm.

The solution and supports are mixed according to any appropriate method to form the dispersion/suspension. Exemplary methods include magnetic stirring, insertion of a stirring structure or apparatus such as a rotor, shaking, sonication, or a combination of the foregoing methods. Provided that the supports can be adequately mixed with the solution, the relative amounts of supports and solution may vary over a wide range. For example, when preparing carbon supported metal electrocatalysts using an aqueous suspension comprising dissolved inorganic metal-containing compounds, the carbon supports typically comprise between about 1 and about 30 weight percent of the suspension. In other embodiments the carbon supports comprise between about 1 and about 15 weight percent of the suspension, between about 1 and about 10 weight percent of the suspension, between about 3 and about 8 weight percent of the suspension, between about 5 and about 7 weight percent of the suspension, or about 6 weight percent of the suspension.

The relative amounts of supports and solution may also be described in terms of volume ratios. In one embodiment the dispersion/suspension has a volume ratio of support particles to solution of at least about 1:10. Specifying a minimum volume ratio indicates that the volume of support particles may be increased relative to the volume of solution. In other embodiments the volume ratio is at least about 1:8, 1:5, and 1:2.

In one method of preparation, the solution and supports described or illustrated herein are mixed using sonication at a power and for a duration sufficient to form a dispersion/suspension in which the pores of the supports are impregnated with the solution and/or the supports are uniformly distributed throughout the solution. If the suspension is not uniformly mixed (i.e., the supports are not uniformly impregnated with the solution and/or the supports are not uniformly distributed throughout the solution), the deposits formed on the supports will typically be non-uniform (e.g., the loading of the metal species may vary among the supports, the size of the deposits may vary significantly on a support and/or among the supports, and/or the composition of the deposits may vary among the supports). Although a uniform mixture is generally preferred, there may be circumstances in which a non-uniform mixture is desirable.

When a freeze-drying method of preparation is employed, typically the uniformity of the suspension is maintained throughout the removal of heat from the suspension. This uniformity may be maintained by continuing the mixing of the suspension as it is being cooled. In one embodiment, however, the uniformity is maintained by the viscosity of the dispersion/suspension. The actual viscosity needed to suspend the particles uniformly depends in large part on the amount of supports in the dispersion/suspension and the size of the supports. To a lesser degree, the necessary viscosity depends on the density of the supports and the specific gravity of the solution. In general, it is typically sufficient to prevent substantial settling of the supports as the heat is being removed from the suspension to precipitate the deposits, and in one embodiment until the dispersion/suspension is frozen. The degree of settling, if any, may be determined, for example, by examining portions of the frozen suspension. Typically, substantial settling would be considered to have occurred if the concentrations of supports in any two portions vary by more than about ±10%. When preparing a carbon support metal electrocatalyst powder in accordance with the freeze-drying method, the viscosity is typically sufficient to prevent settling for at least about 4 minutes. In other embodiments the viscosity prevents settling for at least about 10 minutes, about 30 minutes, about 1 hour, and even up to about 2 days. In another embodiment the viscosity of the dispersion/suspension is at least about 5,000 mPa·s.

Heat is removed from the dispersion/suspension so that at least a part of the solute portion separates from the solvent portion and deposits (e.g., precipitates) the metal species onto the supports and/or onto any pre-existing deposits (e.g., pre-deposited platinum or deposits formed by precipitation of incompatible solutes). If the concentration of supports in the suspension is sufficient (e.g., within the ranges set forth above) and enough heat is removed, nearly all of the metal species to be deposited is separated from the solvent portion to form deposits (e.g., precipitates) comprising the metal species on the supports. In one embodiment the heat is removed to freeze the dispersion/suspension and form a composite comprising the supports with deposits comprising the metal species on the supports within a matrix of the solvent portion in a solid state. If the concentration of the solute portion in the solution exceeds the ability of the supports to accommodate deposits of the metal species, some of the solute portion may crystallize within the matrix. If this occurs, such crystals are not considered to be a supported powder.

In one embodiment of the present invention the deposits of metal species are precursors of a metal alloy and the size of the metal species deposits is controlled such that the eventually formed metal alloy deposits are of size suitable for use as a fuel cell electrocatalyst (e.g., 20 nm, 10 nm, 5 nm, 3 nm (30 Å), 2 nm (20 Å) or smaller). As set forth above, this may be accomplished in part by maintaining a well impregnated and uniformly distributed suspension throughout the removal of heat from the system. Additionally, this may be accomplished by rapidly removing heat from the dispersion/suspension as the compound or compounds are depositing on supports.

The rapid heat removal may be accomplished by cooling the suspension from a temperature of at least about 20° C. to a temperature below the freezing point of the solvent (e.g., at a rate of least about 20° C./minute). In one embodiment the suspension is cooled at a rate of at least about 50° C./minute. In another embodiment the suspension is cooled at a rate between about 50 and 100° C./minute. Typically, such cooling rates freeze the suspension from a temperature such as room temperature (about 20° C.) or higher (e.g., about 100° C.) within a freezing period of not more than about 10, 5, or 3 minutes.

The heat may be removed from the dispersion/suspension by any appropriate method. For example, a container containing a volume of dispersion/suspension may be placed within a refrigeration unit such as freeze-dryer, a volume of dispersion/suspension may be contacted with a cooled surface (e.g., a plate or container), a volume of dispersion/suspension in a container may be immersed in, or otherwise contacted with, a cryogenic liquid. Advantageously, the same container may also be used during the formation of the dispersion and/or during the separation of solvent from deposited supports. In one embodiment a cover is placed over an opening of the container. Although the cover may completely prevent the escape of any solid matter from the container, in one embodiment the cover allows for a gas to exit the container and substantially prevents the supports from exiting the container. An example of such a cover includes a stretchable film (e.g., PARAFILM) having holes that are, for example, less than about 500 μm in size (maximum length across the hole).

In one embodiment the dispersion/suspension is cooled at a rate of at least about 20° C./minute by immersing a container containing the dispersion/suspension in a volume of cryogenic liquid within a cryogen container sized and shaped so that at least about 50, 60, 70, 80, or 90 percent of the surface of the dispersion/suspension container is contacted with the cryogenic liquid. The cryogenic liquid is typically at a temperature that is at least about 20° C. below the freezing point of the solvent. Examples of suitable cryogenic liquids typically include liquid nitrogen, liquid helium, liquid argon, but even less costly media may be utilized (for example, an ice water/hydrous calcium chloride mixture can reach temperatures down to about −55° C., an acetone/dry ice mixture that can reach temperatures down to about −78° C., and a diethyl ether/dry ice mixture that can reach temperatures down to about −100° C.).

The container may be made of nearly any type of material. Generally, the selected material does not require special handling procedures, can withstand repeated uses without structural failure (e.g., resistant to thermal shock), does not contribute impurities to the suspension (e.g., resistant to chemical attack), and is thermally conductive. For example, plastic vials made from high density polyethylene may be used.

The supports having the deposits thereon may be separated from the solvent portion by any appropriate method such as filtration, evaporation (e.g., by spray-drying), sublimation (e.g., freeze-drying), or a combination thereof. The evaporation or sublimation rate may be enhanced by adding heat (e.g., raising the temperature of the solvent) and/or decreasing the atmospheric pressure to which the solvent is exposed.

In one embodiment a frozen suspension is freeze-dried to remove the solvent portion from the frozen suspension. The freeze-drying may be carried out in any appropriate apparatus such as a LABONCO FREEZE DRY SYSTEM (Model 79480). Intuitively, one of skill in the art would typically maintain the temperature of the frozen suspension below the melting point of the solvent (i.e., the solvent is removed by sublimation) in order to prevent agglomeration of the supports. The freeze-drying process described or illustrated herein may be carried out under such conditions. Surprisingly, however, it is not critical that the solvent portion not be allowed to melt. Specifically, it has been discovered that a free-flowing, and non-agglomerated powder may be prepared even if the solvent is allowed to melt, provided that the pressure within the freeze-dryer is maintained at a level that the evaporation rate of the liquid solvent is faster than the melting rate (e.g., below about 0.2 millibar, 0.000197 atm, or 20 Pa). Thus, there is typically not enough solvent in the liquid state to result in agglomeration of the supports. Advantageously, this can be used to decrease the time needed to remove the solvent portion. Removing the solvent portion forms a free-flowing and non-agglomerated supported powder that comprises the supports and deposits of the metal species on the supports.

To accomplish the conversion from precursor to metal, the powder is typically heated in a reducing atmosphere (e.g., an atmosphere containing hydrogen and/or an inert gas such as argon) at a temperature sufficient to decompose the precursor. The temperature reached during the thermal treatment is typically at least as high as the decomposition temperature(s) for the precursor compound(s) and not so high as to result in degradation of the supports and agglomeration of the supports. Typically the temperature is between about 60° C. and about 1100° C. Organometallic compounds tend to decompose a lower temperatures (e.g., 200° C. and lower), whereas inorganic metal-containing compounds typically decompose at higher temperatures (e.g., between about 200 and 1000° C.). Typically, temperatures do not exceed about 1000° C., which is adequate for forming/alloying most metals.

The duration of the heat treatment is typically at least sufficient to substantially convert the precursor deposits to the desired state. In general, the temperature and time are inversely related (i.e., conversion is accomplished in a shorter period of time at higher temperatures and vice versa). At the temperatures typical for converting the inorganic metal-containing compounds to a metal alloy set forth above, the duration of the heat treatment is typically at least about 30 minutes. In one embodiment, the duration is between about 1 and about 14 hours.

Referring to FIG. 1, a carbon supported metal alloy electrocatalyst powder particle 1 of the present invention, produced in accordance with the freeze-drying method described or illustrated herein, comprises a carbon support 2 and deposits 3 of the metal alloy on the support. A particle and a powder comprising said particles may have a loading that is up to about 90 weight percent. However, when a supported metal powder is used as a fuel cell electrocatalyst, the loading is typically between about 5 and about 60 weight percent, and in one embodiment between about 15 and about 45 weight percent, or about 20 and about 40 weight percent. Increasing the loading to greater than about 60 weight percent does not typically result in an increase in the activity. Without being held to a particular theory, it is believed the excess loading covers a portion of the deposited metal and the covered portion cannot catalyze the desired electrochemical reaction. On the other hand, the activity of the supported metal electrocatalyst typically decreases significantly if the loading is below about 5 weight percent.

This freeze-dry method may be used to produce supported metal alloy powders that are heavily loaded with nanoparticle deposits of a metal alloy that comprises one or more non-noble metals, wherein the deposits have a relatively narrow size distribution. In one embodiment the supported non-noble metal-containing metal alloy powder has a metal loading of at least about 20 weight percent of the powder, an average deposit size that is no greater than about 10 nm, and a deposit size distribution in which at least about 70 percent of the deposits are within about 50 and 150 percent of the average deposit size. In other embodiments the metal loading is between about 20 and about 60 weight percent, or between about 20 and about 40 weight percent. In other embodiments the average size of the metal alloy deposits is no greater than about 5 nm (50 Å), no greater than 3 nm (30 Å), or no greater than about 2 nm (20 Å). In another embodiment the average size of the metal alloy deposits is between about 3 nm and about 10 nm. In another embodiment the size distribution of the deposits is such that at least about 80 percent of the deposits are within about 75 and 125 percent of the average deposit size.

The freeze-dry method of preparing supported electrocatalyst powders allows for superior control of the stoichiometry of the deposits because the suspension is preferably kept within a single container, the solution is not physically separated from the supports (e.g., by filtration), and freezing results in substantially all of the solute precipitating on the supports. Additionally, the deposits tend to be isolated, small, and uniformly dispersed over the surface of the supports and thereby increasing the overall electrocatalytic activity. Still further, because filtering is not necessary, extremely fine particles are not lost and the supported metal powders produced by the present method tend to have a greater surface area and activity. Also, the act of depositing the metal species on the supports is fast. For example, immersing a container of the suspension in a cryogenic liquid can solidify the suspension in about three to four minutes.

Unsupported Catalyst or Alloys in Electrode/Fuel Cell Applications

It is to be noted that, in another embodiment of the present invention, the metal substance (e.g., catalyst or alloy) may be unsupported; that is, it may be employed in the absence of a support particle. More specifically, it is to be noted that in another embodiment of the present invention a metal catalyst or alloy, comprising platinum, indium, and at least one of tungsten, iron, and manganese, may be directly deposited (e.g., sputtered) onto, for example, (i) a surface of one or both of the electrodes (e.g., the anode, the cathode or both), and/or (ii) one or both surfaces of a polyelectrolyte membrane, and/or (iii) some other surface, such as a backing for the membrane (e.g., carbon paper).

In this regard it is to be further noted that each component (e.g., metal) of the catalyst or alloy may be deposited separately, each for example as a separate layer on the surface of the electrode, membrane, etc. Alternatively, two or more components may be deposited at the same time. Additionally, in the case of an alloy, the alloy may be formed and then deposited, or the components thereof may be deposited and then the alloy subsequently formed thereon.

Deposition of the component(s) may be achieved using means known in the art, including for example known sputtering techniques (see, e.g., PCT Application No. WO 99/16137). Generally speaking, however, in one approach sputter-deposition is achieved by creating, within a vacuum chamber in an inert atmosphere, a voltage differential between a target component material and the surface onto which the target component is to be deposited, in order to dislodge particles from the target component material which are then attached to the surface of, for example, an electrode or electrolyte membrane, thus forming a coating of the target component thereon. In one embodiment, the components are deposited on a polymeric electrolyte membrane, including for example (i) a copolymer membrane of tetrafluoroethylene and perfluoropolyether sulfonic acid (such as the membrane material sold under the trademark NAFION), (ii) a perfluorinated sulfonic acid polymer (such as the membrane material sold under the trademark ACIPLEX), (iii) polyethylene sulfonic acid polymers, (iv) polyketone sulfonic acids, (v) polybenzimidazole doped with phosphoric acid, (vi) sulfonated polyether sulfones, and (vii) other polyhydrocarbon-based sulfonic acid polymers.

It is to be noted that the specific amount of each metal or component of the catalyst or alloy may be controlled independently, in order to tailor the composition to a given application. In some embodiments, however, the amount of each deposited component may be less than about 5 mg/cm$^2$ of surface area (e.g., electrode surface area, membrane surface area, etc.), less than about 1 mg/cm$^2$, less than about 0.5 mg/cm$^2$, less than about 0.1 mg/cm$^2$, or even less than about 0.05 mg/cm$^2$. Alternatively, in some embodiments the amount of the deposited component, or alloy, may range from about 0.5 mg/cm$^2$ to less than about 5 mg/cm$^2$, or from about 0.1 mg/cm$^2$ to less than about 1 mg/cm$^2$.

It is to be further noted that the specific amount of each component, and/or the conditions under which the component is deposited, may be controlled in order to control the resulting thickness of the component, or alloy, layer on the surface of the electrode, electrolyte membrane, etc. For example, as determined by means known in the art (e.g., scanning electron microscopy or Rutherford back scattering spectrophotometric method), the deposited layer may have a thickness ranging from several angstroms (e.g., about 2, 4, 6, 8, 10 or more) to several tens of angstroms (e.g., about 20, 40, 60, 80, 100 or more), up to several hundred angstroms (e.g., about 200, 300, 400, 500 or more). Additionally, after all of the components have been deposited, and/or alloyed (or, alternatively, after the alloy has been deposited), the layer of the multi-component metal substance of the present invention may have a thickness ranging from several tens of angstroms (e.g., about 20, 40, 60, 80, 100 or more), up to several hundred angstroms (e.g., about 200, 400, 600, 800, 1000, 1500 or more). Thus, in different embodiments the thickness may be, for example, between about 10 and about 500 angstroms, between about 20 and about 200 angstroms, and between about 40 and about 100 angstroms.

It is to be still further noted that in embodiments wherein a catalyst or alloy (or the components thereof) are deposited as a thin film on the surface of, for example, an electrode or electrolyte membrane, the composition of the deposited catalyst or alloy may be as previously described herein. Additionally, in other embodiments, the composition of the deposited catalyst or alloy may be other than as previously described. For example, with respect to an embodiment of an unsupported catalyst or alloy, this catalyst or alloy may comprise platinum, indium at a concentration no greater than about 15 atomic percent, and at least one of tungsten, iron, and manganese.

Incorporation of an Electrocatalyst Composition in a Fuel Cell

Figure 2:
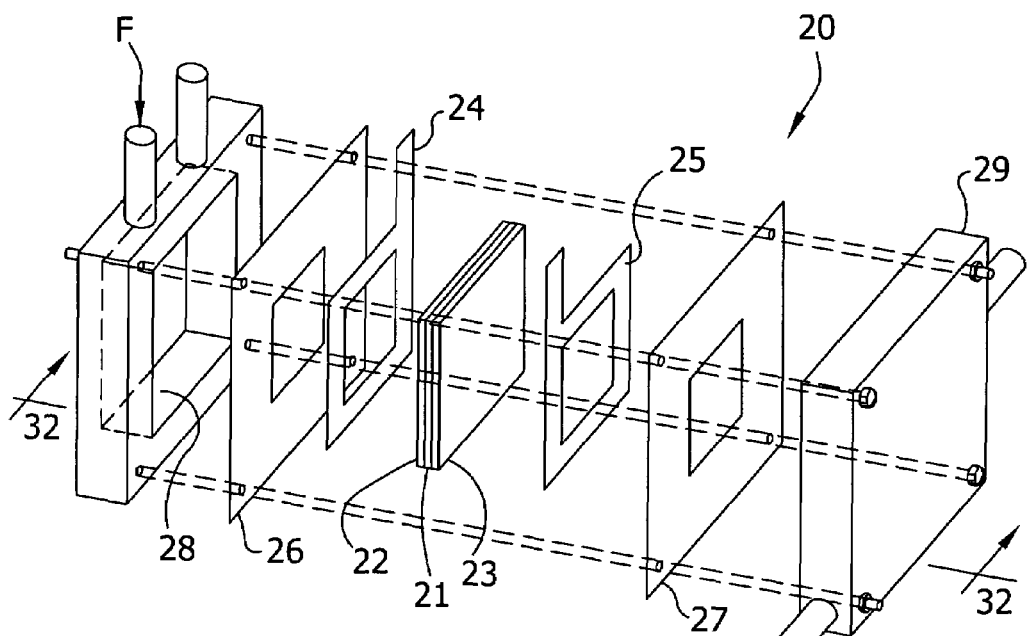
FIG. 2 is an exploded, schematic structural view showing members of a fuel cell.
Figure 3:
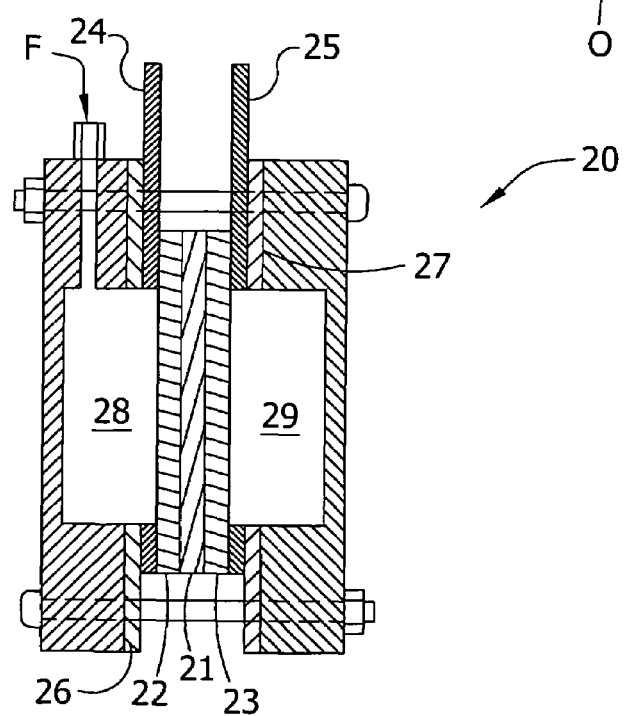
FIG. 3 is a cross-sectional view of the assembled fuel cell of FIG. 2.

The alloy compositions of the present invention are particularly suited for use in proton exchange membrane fuel cells. As shown in FIGS. 2 and 3, a fuel cell, generally indicated 20, comprises a fuel electrode (anode) 22 and an air electrode, oxidizer electrode (cathode) 23. In between the electrodes 22 and 23, a proton exchange membrane 21 serves as an electrolyte and it is usually a strongly acidic ion exchange membrane such as a perfluorosulphonic acid-based membrane. Preferably, the proton exchange membrane 21, the anode 22, and the cathode 23 are integrated into one body to minimize contact resistance between the electrodes and the proton exchange membrane. Current collectors 24 and 25 engage the anode and the cathode, respectively. A fuel chamber 28 and an air chamber 29 contain the respective reactants and are sealed by sealants 26 and 27, respectively.

In general, electricity is generated by hydrogen-containing fuel combustion (i.e., the hydrogen-containing fuel and oxygen react to form water, carbon dioxide and electricity). This is accomplished in the above-described fuel cell by introducing the hydrogen-containing fuel F into the fuel chamber 28, while oxygen O (preferably air) is introduced into the air chamber 29, whereby an electric current can be immediately transferred between the current collectors 24 and 25 through an outer circuit (not shown). Ideally, the hydrogen-containing fuel is oxidized at the anode 22 to produce hydrogen ions, electrons, and possibly carbon dioxide gas. The hydrogen ions migrate through the strongly acidic proton exchange membrane 21 and react with oxygen and electrons transferred through the outer circuit to the cathode 23 to form water. If the hydrogen-containing fuel F is methanol, it is preferably introduced as a dilute acidic solution to enhance the chemical reaction, thereby increasing power output (e.g., a 0.5 M methanol/0.5 M sulfuric acid solution).

To prevent the loss of ionic conduction in the proton exchange membranes, these typically remain hydrated during operation of the fuel cell. As a result, the material of the proton exchange membrane is typically selected to be resistant to dehydration at temperatures up to between about 100 and about 120° C. Proton exchange membranes usually have reduction and oxidation stability, resistance to acid and hydrolysis, sufficiently low electrical resistivity (e.g., <10 $\Omega \cdot cm$), and low hydrogen or oxygen permeation. Additionally, proton exchange membranes are usually hydrophilic. This ensures proton conduction (by reversed diffusion of water to the anode), and prevents the membrane from drying out thereby reducing the electrical conductivity. For the sake of convenience, the layer thickness of the membranes is typically between 50 and 200 µm. In general, the foregoing properties are achieved with materials that have no aliphatic hydrogen-carbon bonds, which, for example, are achieved by replacing hydrogen with fluorine or by the presence of aromatic structures; the proton conduction results from the incorporation of sulfonic acid groups (high acid strength). Suitable proton-conducting membranes also include perfluorinated sulfonated polymers such as NAFION and its derivatives produced by E.I. du Pont de Nemours & Co., Wilmington, Del. NAFION is based on a copolymer made from tetrafluoroethylene and perfluorovinylether, and is provided with sulfonic groups working as ion-exchanging groups. Other suitable proton exchange membranes are produced with monomers such as perfluorinated compounds (e.g., octafluorocyclobutane and perfluorobenzene), or even monomers with C—H bonds that do not form any aliphatic H atoms in a plasma polymer, which could constitute attack sites for oxidative breakdown.

The electrodes of the present invention comprise the electrocatalyst compositions of the present invention and an electrode substrate upon which the electrocatalyst is deposited. In one embodiment the electrocatalyst alloy is directly deposited on the electrode substrate. In another embodiment the electrocatalyst alloy is supported on electrically conductive supports and the supported electrocatalyst is deposited on the electrode substrate. The electrode may also comprise a proton conductive material that is in contact with the electrocatalyst. The proton conductive material may facilitate contact between the electrolyte and the electrocatalyst, and may thus enhance fuel cell performance. Preferably, the electrode is designed to increase cell efficiency by enhancing contact between the reactant (i.e., fuel or oxygen), the electrolyte and the electrocatalyst. In particular, porous or gas diffusion electrodes are typically used since they allow the fuel/oxidizer to enter the electrode from the face of the electrode exposed to the reactant gas stream (back face), and the electrolyte to penetrate through the face of the electrode exposed to the electrolyte (front face), and reaction products, particularly water, to diffuse out of the electrode.

Preferably, the proton exchange membrane, electrodes, and electrocatalyst materials are in contact with each other. This is typically accomplished by depositing the electrocatalyst either on the electrode, or on the proton exchange membrane, and then placing the electrode and membrane in contact. The alloy electrocatalysts of this invention can be deposited on either the electrode or the membrane by a variety of methods, including plasma deposition, powder application (the powder may also be in the form of a slurry, a paste, or an ink), chemical plating, and sputtering. Plasma deposition generally entails depositing a thin layer (e.g., between 3 and 50 µm, preferably between 5 and 20 µm) of an electrocatalyst composition on the membrane using low-pressure plasma. By way of example, an organic platinum compound such as trimethylcyclopenta-dienylplatinum is gaseous between $10^{-4}$ and 10 mbar and can be excited using radio-frequency, microwaves, or an electron cyclotron resonance transmitter to deposit platinum on the membrane. According to another procedure, electrocatalyst powder is distributed onto the proton exchange membrane surface and integrated at an elevated temperature under pressure. If, however, the amount of electrocatalyst particles exceeds about 2 $mg/cm^2$ the inclusion of a binder such as polytetrafluoroethylene is common. Further, the electrocatalyst may be plated onto dispersed small support particles (e.g., the size is typically between 20 and 200 Å, and more preferably between about 20 and 100 Å). This increases the electrocatalyst surface area, which in turn increases the number of reaction sites leading to improved cell efficiency. In one such chemical plating process, for example, a powdery carrier material such as conductive carbon black is contacted with an aqueous solution or aqueous suspension (slurry) of compounds of metallic components constituting the alloy to permit adsorption or impregnation of the metallic compounds or their ions on or in the carrier. Then, while the slurry is stirred at high speed, a dilute solution of suitable fixing agent such as ammonia, hydrazine, formic acid, or formalin is slowly added dropwise to disperse and deposit the metallic components on the carrier as insoluble compounds or partly reduced fine metal particles.

The loading, or surface concentration, of an electrocatalyst on the membrane or electrode is based in part on the desired power output and cost for a particular fuel cell. In general, power output increases with increasing concentration; however, there is a level beyond which performance is not improved. Likewise, the cost of a fuel cell increases with increasing concentration. Thus, the surface concentration of electrocatalyst is selected to meet the application requirements. For example, a fuel cell designed to meet the requirements of a demanding application such as an extraterrestrial vehicle will usually have a surface concentration of electrocatalyst sufficient to maximize the fuel cell power output. For less demanding applications, economic considerations dictate that the desired power output be attained with as little electrocatalyst as possible. Typically, the loading of electrocatalyst is between about 0.01 and about 6 mg/cm$^2$. Experimental results to date indicate that in some embodiments the electrocatalyst loading is preferably less than about 1 mg/cm$^2$, and more preferably between about 0.1 and 1 mg/cm$^2$.

To promote contact between the collector, electrode, electrocatalyst, and membrane, the layers are usually compressed at high temperature. The housings of the individual fuel cells are configured in such a way that a good gas supply is ensured, and at the same time the product water can be discharged properly. Typically, several fuel cells are joined to form stacks, so that the total power output is increased to economically feasible levels.

In general, the electrocatalyst compositions and fuel cell electrodes of the present invention may be used to electrocatalyze any fuel containing hydrogen (e.g., hydrogen and reformatted-hydrogen fuels). Also, hydrocarbon-based fuels may be used including saturated hydrocarbons such as methane (natural gas), ethane, propane and butane; garbage off-gas; oxygenated hydrocarbons such as methanol and ethanol; and fossil fuels such as gasoline and kerosene; and mixtures thereof.

To achieve the full ion-conducting property of proton exchange membranes, in some embodiments suitable acids (gases or liquids) are typically added to the fuel. For example, $SO_2$, $SO_3$, sulfuric acid, trifluoromethanesulfonic acid or the fluoride thereof, also strongly acidic carboxylic acids such as trifluoroacetic acid, and volatile phosphoric acid compounds may be used ("Ber. Bunsenges. Phys. Chem.", Volume 98 (1994), pages 631 to 635).

Fuel Cell Uses

As set forth above, the alloy compositions of the present invention are useful as electrocatalysts in fuel cells that generate electrical energy to perform useful work. For example, the alloy compositions may be used in fuel cells which are in electrical utility power generation facilities; uninterrupted power supply devices; extraterrestrial vehicles; transportation equipment such as heavy trucks, automobiles, and motorcycles (see, Fuji et al., U.S. Pat. No. 6,048,633; Shinkai et al., U.S. Pat. No. 6,187,468; Fuji et al., U.S. Pat. No. 6,225,011; and Tanaka et al., U.S. Pat. No. 6,294,280); residential power generation systems; mobile communications equipment such as wireless telephones, pagers, and satellite phones (see, Prat et al., U.S. Pat. No. 6,127,058 and Kelley et al., U.S. Pat. No. 6,268,077); mobile electronic devices such as laptop computers, personal data assistants, audio recording and/or playback devices, digital cameras, digital video cameras, and electronic game playing devices; military and aerospace equipment such as global positioning satellite devices; and robots.

DEFINITIONS

Activity is defined as the maximum sustainable, or steady state, current (Amps) obtained from the electrocatalyst, when fabricated into an electrode, at a given electric potential (Volts). Additionally, because of differences in the geometric area of electrodes, when comparing different electrocatalysts, activity is often expressed in terms of current density (A/cm$^2$).

An alloy may be described as a solid solution in which the solute and solvent atoms (the term solvent is applied to the metal that is in excess) are arranged at random, much in the same way as a liquid solution may be described. If some solute atoms replace some of those of the solvent in the structure of the latter, the solid solution may be defined as a substitutional solid solution. Alternatively, an interstitial solid solution is formed if a smaller atom occupies the interstices between the larger atoms. Combinations of the two types are also possible. Furthermore, in certain solid solutions, some level of regular arrangement may occur under the appropriate conditions resulting in a partial ordering that may be described as a superstructure. These solid solutions may have characteristics that may be distinguishable through characterization techniques such as XRD. Significant changes in XRD may be apparent due to changes in symmetry. Although the global arrangement of the metal atoms may be similar in the case of a solid solution and an ordered alloy, the relationship between the specific locations of the metal A and metal B atoms is now ordered, not random, resulting in different diffraction patterns. Further, a homogeneous alloy is a single compound comprising the constituent metals. A heterogeneous alloy comprises an intimate mixture of crystals of individual metals and/or metallic compounds (see, Structural Inorganic Chemistry, A.F. Wells, Oxford University Press, 5th Edition, 1995, chapter 29). An alloy, as defined herein, is also meant to include materials which may comprise elements which are generally considered to be non-metallic. For example, some alloys of the present invention may comprise oxygen and/or carbon in an amount(s) that a generally considered to be a low or impurity level (see, e.g., Structural Inorganic Chemistry, A.F. Wells, Oxford University Press, 5$^{th}$ Edition, 1995, chapter 29).

EXAMPLE 1

Forming Electrocatalytic Alloys on Individually Addressable Electrodes

The electrocatalyst alloy compositions set forth in Tables A-E, infra, were prepared using the combinatorial techniques disclosed in Warren et al., U.S. Pat. No. 6,187,164; Wu et al., U.S. Pat. No. 6,045,671; Strasser, P., Gorer, S, and Devenney, M., *Combinatorial Electrochemical Techniques For The Discovery of New Fuel-Cell Cathode Materials*, Nayayanan, S. R., Gottesfeld, S, and Zawodzinski, T., eds., Direct Methanol Fuel Cells, Proceedings of the Electrochemical Society, New Jersey, 2001, p. 191; and Strasser, P., Gorer, S, and Devenney, M., *Combinatorial Electrochemical Strategies For The Discovery of New Fuel-Cell Electrode Materials*, Proceedings of the International Symposium on Fuel Cells for Vehicles, 41 st Battery Symposium, The Electrochemical Society of Japan, Nagoya 2000, p. 153. For example, an array of independent electrodes (with areas of between about 1 and 3 mm$^2$) may be fabricated on inert substrates (e.g., glass, quartz, sapphire alumina, plastics, and thermally treated silicon). The individual electrodes were located substantially in the center of the substrate, and were connected to contact pads around the periphery of the substrate with wires. The electrodes, associated wires, and contact pads were fabricated from a conducting material (e.g., titanium, gold, silver, platinum, copper or other commonly used electrode materials).

Specifically, the alloy compositions set forth in Tables A-E were prepared using a photolithography/RF magnetron sputtering technique (GHz range) to deposit thin-film alloys on arrays of 64 individually addressable electrodes. A quartz insulating substrate was provided and photolithographic techniques were used to design and fabricate the electrode patterns on it. By applying a predetermined amount of photoresist to the substrate, photolyzing preselected regions of the photoresist, removing those regions that have been photolyzed (e.g., by using an appropriate developer), depositing a layer of titanium about 500 nm thick using RF magnetron sputtering over the entire surface and removing predetermined regions of the deposited titanium (e.g. by dissolving the underlying photoresist), intricate patterns of individually addressable electrodes were fabricated on the substrate.

Figure 4:
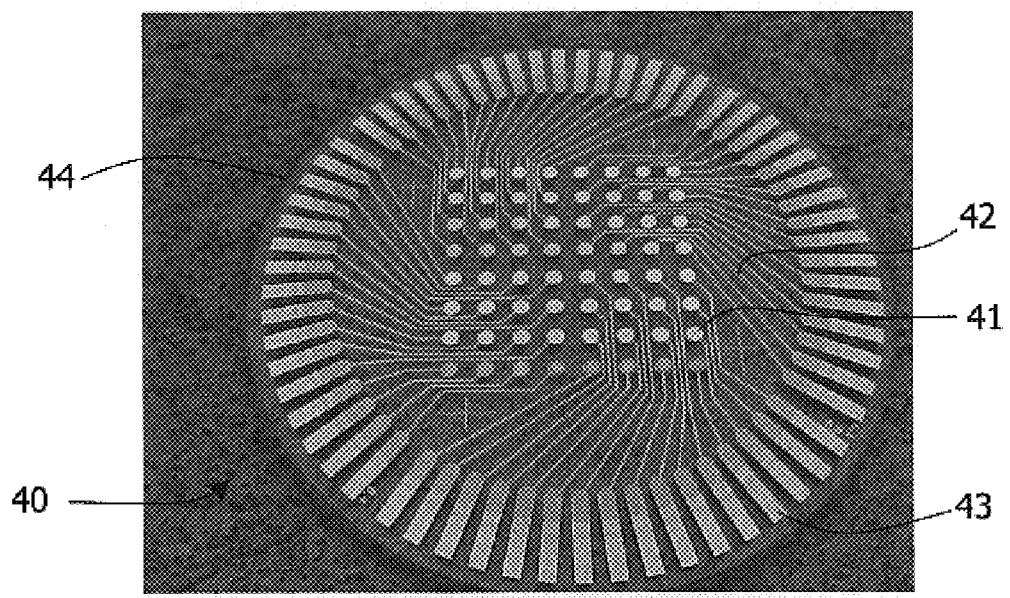
FIG. 4 is a photograph of an electrode array comprising thin-film alloy compositions deposited on individually addressable electrodes, in accordance with the present invention.

Referring to FIG. 4, the fabricated array 40 consisted of 64 individually addressable electrodes 41 (about 1.7 mm in diameter) arranged in an 8×8 square that were insulated from each other (by adequate spacing) and from the substrate 44 (fabricated on an insulating substrate), and whose interconnects 42 and contact pads 43 were insulated from the electrochemical testing solution (by the hardened photoresist or other suitable insulating material).

After the initial array fabrication and prior to depositing the electrocatalyst alloys for screening, a patterned insulating layer covering the wires and an inner portion of the peripheral contact pads was deposited, but leaving the electrodes and the outer portion of the peripheral contact pads exposed (preferably approximately half of the contact pad is covered with this insulating layer). Because of the insulating layer, it is possible to connect a lead (e.g., a pogo pin or an alligator clip) to the outer portion of a given contact pad and address its associated electrode while the array is immersed in solution, without having to worry about reactions that can occur on the wires or peripheral contact pads. The insulating layer was a hardened photoresist, but any other suitable material known to be insulating in nature could have been used (e.g., glass silica, alumina, magnesium oxide, silicon nitride, boron nitride, yttrium oxide, or titanium dioxide).

Following the creation of the titanium coated array, a steel mask having 64 holes (1.7 mm in diameter) was pressed onto the substrate to prevent deposition of sputtered material onto the insulating resist layer. The deposition of the electrocatalyst alloys was also accomplished using RF magnetron sputtering and a two shutter masking system as described by Wu et al. which enable the deposition of material onto 1 or more electrodes at a time. Each individual thin-film electrocatalyst alloy is created by a super lattice deposition method. For example, when preparing a ternary alloy electrocatalyst composition, metals M1, M2 and M3 are to be deposited and alloyed onto one electrode. First, a metal M1 sputter target is selected and a thin film of M1 having a defined thickness is deposited on the electrode. This initial thickness is typically from about 3 to about 12 Å. After this, metal M2 is selected as the sputter target and a layer of M2 is deposited onto the layer of M1. The thickness of M2 layer is also from about 3 to about 12 Å. The thicknesses of the deposited layers are in the range of the diffusion length of the metal atoms (e.g., about 10 to about 30 Å) which allows in-situ alloying of the metals. Then, a layer of M3 is deposited onto the M1-M2 alloy forming a M1-M2-M3 alloy film. As a result of the three deposition steps, an alloy thin-film (9-25 Å thickness) of the desired stoichiometry is created. This concludes one deposition cycle. In order to achieve the desired total thickness of an electrocatalyst material, deposition cycles are repeated as necessary which results in the creation of a super-lattice structure of a defined total thickness (typically about 700 Å). Although the number, thickness (stoichiometry) and order of application of the individual metal layers may be determined manually, it is desirable to utilize a computer program to design an output file which contains the information necessary to control the operation of the sputtering device during the preparation of a particular library wafer (i.e., array). One such computer program is the LIBRARY STUDIO software available from Symyx Technologies, Inc. of Santa Clara, Calif. and described in European Patent No. 1080435 B1. The compositions of several as sputtered alloy compositions were analyzed using Energy Dispersive Spectroscopy (EDS) to confirm that they were consistent with desired compositions (chemical compositions determined using EDS are within about 5% of the actual composition).

Arrays were prepared to evaluate the specific alloy compositions set forth in Tables A-E below. On each array one electrode consisted essentially of platinum and it served as an internal standard for the screening operation.

TABLE A

| Electrode Number | End Current Density (Absolute Activity) mA/cm$^2$ | End Current Density per Weight Fraction of Pt | Relative Activity Compared to Internal Pt | Pt atomic % | In atomic % | W atomic % |
| --- | --- | --- | --- | --- | --- | --- |
| 50 | −2.817 | −12.618 | 5.469 | 20.69 | 7.80 | 71.51 |
| 33 | −2.676 | −11.279 | 5.195 | 21.20 | 17.25 | 61.55 |
| 41 | −2.185 | −10.723 | 4.241 | 18.48 | 12.84 | 68.68 |
| 43 | −1.785 | −7.421 | 3.465 | 21.58 | 16.26 | 62.16 |
| 34 | −1.515 | −6.993 | 2.942 | 19.13 | 19.93 | 60.94 |
| 42 | −1.092 | −6.266 | 2.120 | 15.65 | 15.10 | 69.25 |
| 52 | −1.081 | −2.255 | 2.098 | 45.10 | 7.72 | 47.18 |
| 26 | −1.051 | −4.188 | 2.041 | 21.87 | 23.72 | 54.41 |

TABLE B

| Electrode Number | End Current Density (Absolute Activity) mA/cm$^2$ | End Current Density per Weight Fraction of Pt | Relative Activity Compared to Internal Pt | Pt atomic % | In atomic % | Fe atomic % |
| --- | --- | --- | --- | --- | --- | --- |
| 36 | −2.581 | −4.529 | 5.636 | 32.83 | 18.38 | 48.79 |
| 22 | −2.220 | −3.911 | 4.846 | 37.36 | 34.87 | 27.77 |
| 29 | −2.126 | −3.739 | 4.643 | 34.95 | 26.10 | 38.95 |
| 15 | −1.457 | −2.571 | 3.180 | 40.13 | 44.96 | 14.91 |
| 37 | −1.035 | −1.550 | 2.260 | 43.77 | 18.80 | 37.43 |

TABLE B-continued

| Electrode Number | End Current Density (Absolute Activity) mA/cm² | End Current Density per Weight Fraction of Pt | Relative Activity Compared to Internal Pt | Pt atomic % | In atomic % | Fe atomic % |
|---|---|---|---|---|---|---|
| 44 | −1.031 | −1.540 | 2.250 | 41.21 | 11.80 | 46.99 |
| 30 | −0.987 | −1.481 | 2.156 | 46.66 | 26.74 | 26.60 |
| 51 | −0.912 | −1.361 | 1.991 | 38.94 | 5.57 | 55.49 |
| 23 | −0.862 | −1.296 | 1.882 | 49.97 | 35.78 | 14.25 |
| 43 | −0.777 | −1.361 | 1.696 | 30.95 | 11.55 | 57.50 |
| 31 | −0.776 | −1.040 | 1.695 | 58.97 | 27.39 | 13.61 |
| 45 | −0.749 | −0.999 | 1.634 | 51.92 | 12.06 | 36.01 |
| 38 | −0.746 | −0.998 | 1.629 | 55.22 | 19.25 | 25.53 |

TABLE C

| Electrode Number | End Current Density (Absolute Activity) mA/cm² | End Current Density per Weight Fraction of Pt | Pt atomic % | In atomic % | Fe atomic % | Mn atomic % |
|---|---|---|---|---|---|---|
| 47 | −1.200 | −1.960 | 37.01 | 17.88 | 40.72 | 4.38 |
| 56 | −0.979 | −1.398 | 50.79 | 25.25 | 23.95 | 0 |
| 55 | −0.796 | −1.220 | 44.47 | 25.79 | 24.46 | 5.27 |
| 54 | −0.709 | −1.191 | 37.87 | 26.35 | 25.00 | 10.77 |
| 29 | −0.657 | −1.544 | 18.98 | 8.25 | 62.64 | 10.12 |
| 20 | −0.531 | −1.632 | 12.76 | 4.93 | 70.20 | 12.10 |
| 46 | −0.400 | −0.720 | 31.40 | 18.21 | 41.45 | 8.93 |

TABLE D

| Electrode Number | End Current Density (Absolute Activity) mA/cm² | End Current Density per Weight Fraction of Pt | Pt atomic % | In atomic % | Mn atomic % |
|---|---|---|---|---|---|
| 17 | −3.01 | −6.83 | 30 | 60 | 10 |
| 63 | −2.68 | −5.81 | 30 | 50 | 20 |
| 33 | −2.66 | −8.10 | 20 | 60 | 20 |
| 39 | −2.48 | −7.94 | 20 | 70 | 10 |
| 25 | −2.43 | −7.76 | 20 | 70 | 10 |
| 7 | −2.30 | −7.00 | 20 | 60 | 20 |
| 49 | −2.19 | −3.96 | 40 | 50 | 10 |
| 15 | −2.17 | −6.27 | 20 | 50 | 30 |
| 1 | −2.13 | −6.17 | 20 | 50 | 30 |
| 12 | −1.78 | −2.95 | 40 | 30 | 30 |
| 9 | −1.70 | −4.67 | 20 | 40 | 40 |
| 4 | −1.42 | −2.46 | 40 | 40 | 20 |
| 29 | −1.31 | −3.38 | 20 | 30 | 50 |
| 36 | −1.30 | −2.34 | 40 | 50 | 10 |
| 27 | −1.20 | −2.35 | 30 | 30 | 40 |
| 19 | −1.05 | −1.66 | 40 | 20 | 40 |
| 37 | −1.01 | −2.45 | 20 | 20 | 60 |
| 38 | −1.01 | −1.48 | 50 | 30 | 20 |
| 57 | −1.00 | −2.07 | 30 | 40 | 30 |
| 53 | −0.96 | −1.44 | 40 | 10 | 50 |
| 3 | −0.86 | −1.52 | 30 | 10 | 60 |
| 6 | −0.86 | −1.21 | 50 | 20 | 30 |
| 41 | −0.71 | −1.08 | 50 | 40 | 10 |
| 2 | −0.70 | −1.03 | 50 | 30 | 20 |
| 34 | −0.70 | −1.07 | 50 | 40 | 10 |
| 60 | −0.68 | −1.00 | 50 | 30 | 20 |
| 14 | −0.67 | −0.91 | 50 | 10 | 40 |
| 10 | −0.67 | −0.94 | 50 | 20 | 30 |
| 62 | −0.66 | −0.82 | 60 | 10 | 30 |
| 54 | −0.66 | −0.79 | 70 | 20 | 10 |
| 45 | −0.64 | −0.82 | 50 | 0 | 50 |
| 51 | −0.63 | −0.84 | 50 | 10 | 40 |
| 8 | −0.63 | −0.73 | 70 | 10 | 20 |
| 58 | −0.62 | −0.80 | 60 | 20 | 20 |
| 40 | −0.62 | −0.75 | 70 | 20 | 10 |
| 22 | −0.62 | −0.83 | 60 | 30 | 10 |
| 5 | −0.60 | −1.36 | 20 | 10 | 70 |
| 21 | −0.57 | −1.06 | 30 | 20 | 50 |

TABLE D-continued

| Electrode Number | End Current Density (Absolute Activity) mA/cm$^2$ | End Current Density per Weight Fraction of Pt | Pt atomic % | In atomic % | Mn atomic % |
|---|---|---|---|---|---|
| 30 | −0.55 | −0.84 | 50 | 40 | 10 |
| 35 | −0.45 | −0.83 | 30 | 20 | 50 |

TABLE E

| Electrode Number | End Current Density (Absolute Activity) mA/cm$^2$ | End Current Density per Weight Fraction of Pt | Relative Activity Compared to Internal Pt | Pt atomic % | In atomic % | W atomic % | Mn atomic % |
|---|---|---|---|---|---|---|---|
| 29 | −4.30 | −6.35 | 8.28 | 50 | 10 | 10 | 30 |
| 27 | −3.21 | −4.70 | 6.18 | 50 | 30 | 0 | 20 |
| 18 | −3.16 | −5.28 | 6.09 | 50 | 20 | 20 | 10 |
| 32 | −2.80 | −4.47 | 5.38 | 50 | 30 | 10 | 10 |
| 31 | −2.73 | −4.91 | 5.26 | 45 | 9 | 27 | 18 |
| 20 | −1.30 | −2.70 | 2.51 | 40 | 20 | 30 | 10 |
| 50 | −1.14 | −2.72 | 2.20 | 30 | 50 | 10 | 10 |
| 42 | −0.90 | −1.72 | 1.74 | 40 | 20 | 20 | 20 |
| 22 | −0.84 | −1.60 | 1.61 | 40 | 20 | 20 | 20 |
| 30 | −0.54 | −0.73 | 1.03 | 60 | 10 | 10 | 20 |
| 28 | −0.53 | −0.78 | 1.03 | 60 | 10 | 20 | 10 |
| 25 | −0.52 | −0.52 | 1.00 | 100 | 0 | 0 | 0 |
| 17 | −0.47 | −0.56 | 0.90 | 80 | 10 | 10 | 0 |
| 26 | −0.45 | −0.56 | 0.86 | 70 | 10 | 10 | 10 |
| 41 | −0.44 | −0.55 | 0.85 | 70 | 10 | 10 | 10 |
| 44 | −0.37 | −0.93 | 0.71 | 30 | 20 | 30 | 20 |
| 2 | −0.32 | −0.85 | 0.62 | 30 | 30 | 30 | 10 |
| 21 | −0.27 | −0.63 | 0.53 | 30 | 20 | 20 | 30 |
| 23 | −0.26 | −0.75 | 0.51 | 27 | 18 | 36 | 18 |
| 34 | −0.24 | −0.41 | 0.47 | 40 | 10 | 10 | 40 |
| 35 | −0.24 | −0.63 | 0.47 | 20 | 30 | 0 | 50 |
| 36 | −0.24 | −0.53 | 0.47 | 30 | 10 | 20 | 40 |
| 43 | −0.19 | −0.59 | 0.37 | 20 | 40 | 10 | 30 |
| 45 | −0.14 | −0.44 | 0.27 | 20 | 20 | 20 | 40 |
| 6 | −0.12 | −0.43 | 0.23 | 20 | 30 | 30 | 20 |
| 58 | −0.11 | −0.25 | 0.22 | 30 | 10 | 20 | 40 |
| 54 | −0.11 | −0.36 | 0.22 | 20 | 50 | 10 | 20 |
| 24 | −0.10 | −0.24 | 0.19 | 30 | 40 | 20 | 10 |
| 37 | −0.08 | −0.22 | 0.16 | 20 | 10 | 10 | 60 |
| 4 | −0.08 | −0.31 | 0.15 | 20 | 30 | 40 | 10 |
| 60 | −0.05 | −0.18 | 0.10 | 20 | 10 | 30 | 40 |
| 52 | −0.03 | −0.12 | 0.07 | 20 | 50 | 20 | 10 |
| 38 | −0.03 | −0.05 | 0.05 | 30 | 10 | 10 | 50 |
| 62 | −0.01 | −0.04 | 0.03 | 20 | 10 | 20 | 50 |
| 14 | −0.01 | −0.04 | 0.02 | 20 | 10 | 50 | 20 |
| 10 | −0.01 | −0.03 | 0.02 | 30 | 10 | 50 | 10 |

EXAMPLE 2

Screening Alloys for Electrocatalytic Activity

The alloy compositions set forth in Tables A-E (set forth above) that were synthesized on arrays according to the method set forth in Example 1 were screened for electrochemical reduction of molecular oxygen to water to determine electrocatalytic activity against the internal and/or external platinum standard.

In general, the array wafers were assembled into an electrochemical screening cell and a screening device established an electrical contact between the 64 electrode electrocatalysts (working electrodes) and a 64-channel multi-channel potentiostat used for the screening. Specifically, each wafer array was placed into a screening device such that all 64 spots are facing upward and a tube cell body that was generally annular and having an inner diameter of about 2 inches (5 cm) was pressed onto the upward facing wafer surface. The diameter of this tubular cell was such that the portion of the wafer with the square electrode array formed the base of a cylindrical volume while the contact pads were outside the cylindrical volume. A liquid ionic solution (i.e., 0.5 M $H_2SO_4$ aqueous electrolyte) was poured into this cylindrical volume and a common counter electrode (i.e., platinum gauze) and a common reference electrode (e.g., mercury/mercury sulfate reference electrode (MMS)) were placed into the electrolyte solution to close the electrical circuit.

A rotator shaft with blades was also placed into the electrolyte to provide forced convection-diffusion conditions during the screening. The rotation rate was typically between about 300 to about 400 rpm. Depending on the screening experiment either argon or pure oxygen was bubbled through the electrolyte during the measurements. Argon served to remove $O_2$ gas in the electrolyte to simulate $O_2$-free conditions used for the initial conditioning of the electrocatalysts. The introduction of pure oxygen served to saturate the electrolyte with oxygen for the oxygen reduction reaction. During the screening, the electrolyte was maintained at 60° C. and the rotation rate was constant. Three groups of tests were performed to screen the activity of the electrocatalysts. The electrolyte was purged with argon for about 20 minutes prior to the electrochemical measurements. The first group of tests comprised cyclic voltammetric measurements while purging the electrolyte with argon. Specifically, the first group of tests comprised:

a. a potential sweep from open circuit potential (OCP) to about +0.3 V to about −0.63 V and back to about +0.3 V at a rate of about 20 mV/s;

b. seventy-five consecutive potential sweeps from OCP to about +0.3 V to about −0.7 V and back to about +0.3 V at a rate of about 200 mV/s; and c. a potential sweep from OCP to about +0.3 V to about −0.63 V and back to about +0.3 V at a rate of about 20 mV/s.

The shape of the cyclic voltammetric (CV) profile of the internal Pt standard catalyst as obtained in test c) was compared to an external standard CV profile obtained from a Pt thin-film electrode that had been pretreated until a stable CV was obtained. If test c resulted in a similar cyclic voltammogram, the first group of experiments was considered completed. If the shape of the cyclic voltammogram of test c did not result in the expected standard Pt CV behavior, tests b and c were repeated until the Pt standard catalyst showed the desired standard voltammetric profile. This way, it was ensured that the Pt standard catalyst showed a stable and well-defined oxygen reduction activity in subsequent experiments. The electrolyte was then purged with oxygen for approximately 30 minutes. The following second group of tests were performed while continuing to purge with oxygen:

a. measuring the open circuit potential (OCP) for a minute; then, the potential was stepped to −0.4 V, held for a minute, and was then swept up to about +0.4 V at a rate of about 10 mV/s;

b. measuring the OCP for a minute; then applying a potential step from OCP to about +0.1 V while measuring the current for about 5 minutes; and c. measuring the OCP for a minute; then applying a potential step from OCP to about +0.2 V while monitoring the current for about 5 minutes.

The third group of tests comprised a repeat of the second group of tests after about one hour from completion of the second group of tests. The electrolyte was continually stirred and purged with oxygen during the waiting period. All the foregoing test voltages are with reference to a mercury/mercury sulfate (MMS) electrode. Additionally, an external platinum standard comprising an array of 64 platinum electrodes in which the oxygen reduction activity of the 64 platinum electrodes averaged between −0.5 to −0.8 mA/cm$^2$ at +0.1V vs. a mercury/mercury sulfate electrode was periodically monitored to ensure the accuracy of the oxygen reduction evaluation.

The specific alloy compositions set forth in Tables A-E were prepared and screened in accordance with the above-described methods and the results are set forth therein. The screening results in Tables A-E are for the third test group steady state currents at +0.1 V MMS. The current value reported (End Current Density) is the result of averaging the last three current values of the chronoamperometric test normalized for geometric surface area.

EXAMPLE 3

Synthesis of Supported Electrocatalyst Alloys

The synthesis of $Pt_{37}In_{36}Fe_{27}$, $Pt_{37}In_{18}Fe_{41}Mn_4$, $Pt_{21}In_8W_{70}$ alloys, and $Pt_{50}In_{30}Mn_{20}$ (see, Table F, Target Catalyst Comp., infra) on carbon support particles was attempted according to different process conditions in order to evaluate the performance of the alloys while in a state that is typically used in fuel cell. To do so, the alloy component precursors were deposited or precipitated on supported platinum powder (i.e., platinum nanoparticles supported on carbon black particles). Platinum supported on carbon black is commercially available from companies such as Johnson Matthey, Inc., of New Jersey and E-Tek Div. of De-Nora, N.A., Inc., of Somerset, N.J. Such supported platinum powder is available with a wide range of platinum loading. The supported platinum powder used in this example had a nominal platinum loading of about 20 or about 40 percent by weight, a platinum surface area of between about 150 and about 170 m$^2$/g (determined by CO adsorption), a combined carbon and platinum surface area between about 350 and about 400 m$^2$/g (determined by N$_2$ adsorption), and an average particle size of less than about 0.5 mm (determined by sizing screen).

Referring to Table F, the electrocatalyst alloys corresponding to the target compositions of $Pt_{37}In_{36}Fe_{27}$, $Pt_{37}In_{18}Fe_{41}Mn_4$, and $Pt_{21}In_8W_{70}$ alloys were formed on carbon support particles using a chemical precipitation method according to the following steps. First, about 0.25 or 0.50 g of carbon supported platinum powder (37 wt % Pt) was dispersed in about 200 ml of room temperature 18 MΩ deionized water using an ultrasonic blending device (e.g., an AQUA-SONIC 50 D set at power level 9) for about 2 hours to form a slurry. The slurry was stirred using a magnetic stirring device, and while being stirred, appropriate volumes based on the targeted electrocatalyst composition of one or more appropriate solutions comprising the metals to be alloyed with the platinum nanoparticles were added drop-wise to the slurry (i.e., a 1 M indium (III) nitrate pentahydrate aqueous solution, a 1 M tungstic acid in 10 wt % ammonium hydroxide aqueous solution, a 1M iron (III) nitrate nonahydrate aqueous solution, and 1 M manganese (II) nitrate aqueous solution). Specifically, to produce the $Pt_{37}In_{36}Fe_{27}$ supported alloy, 0.46 ml of the 1 M indium (III) nitrate pentahydrate solution and 0.35 ml of the 1 M Fe(NO$_3$)$_3$.9H$_2$O solution were added to a 0.25 g carbon supported platinum slurry; to produce the $Pt_{37}In_{18}Fe_{41}Mn_4$ supported alloy, 0.24 ml of the 1M indium (III) nitrate pentahydrate solution, 0.54 ml of the 1 M Fe(NO$_3$)$_3$.9H$_2$O solution and 0.05 ml of the 1M manganese (II) nitrate aqueous solution were added to a 0.25 g carbon supported platinum slurry; and to produce the $Pt_{21}In_8W_{70}$ supported alloy, 0.37 ml of the 1 M indium (III) nitrate pentahydrate solution and 3.26 ml of the 1M tungstic acid in 10 wt % ammonium hydroxide aqueous solution were added to a 0.5 g carbon supported platinum slurry. The stirring was continued and the slurry containing the dissolved metal salts was heated to a temperature between about 60 and about 90° C. for about 1 hour. Precipitation of compounds comprising the metals was then initiated by slowly adding a 10 wt % ammonium hydroxide aqueous solution to the slurry until the slurry had a pH of about 10. The slurry was stirred for about 15 more minutes. The slurry was then filtered from the liquid under vacuum after which the filtrate was washed with about 150 ml of deionized water. The powder was then dried at a temperature between about 60 and about 100° C. for about 4 hours to about 8 hours.

Referring to Table F, the electrocatalyst alloys corresponding to the target compositions of $Pt_{21}In_8W_{71}$ (700° C. for seven and two hours) and $Pt_{50}In_{30}Mn_{20}$ alloys were formed on carbon support particles using a freeze-drying precipitation method. The freeze-drying method comprised forming a precursor solution comprising the desired metal atoms in the desired concentrations. All electrocatalyst alloys were prepared in an analogous manner. To prepare the target $Pt_{21}In_8W_{71}$ alloy composition having a final nominal platinum loading of about 11.5 percent by weight, 0.029 g of $In(NO_3)_3.5H_2O$ and 0.174 g of $(NH_4)_{10}W_{12}O_{41}.5H_2O$ were added to about 5 ml of $H_2O$. Similarly, to prepare the target $Pt_{50}In_{30}Mn_{20}$ alloy composition having a final nominal platinum loading of about 17.6 percent by weight, 0.046 g of $In(NO_3)_3.5H_2O$ and 0.020 g of $Mn(NO_3)_2.4H_2O$ were added to about 5 $H_2O$. The mixtures was heated to about 100° C. for 2 minutes and then introduced into a HDPE (High Density Poly Ethylene) vials containing about 0.200 g of supported platinum powder which had a final nominal platinum loading of about 19.2 percent by weight resulting in a black suspension. The suspensions were homogenized by immersing a probe of a BRANSON SONIFIER 150 into the vial and sonicating the mixture for about 1 minute at a power level of 3. The vials containing the homogenized suspension were then immersed in a liquid nitrogen bath for about 3 minutes to solidify the suspension. The solid suspensions were then freeze-dried for about 24 hours using a LABONCO FREEZE DRY SYSTEM (Model 79480) to remove the solvent. The tray and the collection coil of the freeze dryer were maintained at about 26° C. and about −48° C., respectively, while evacuating the system (the pressure was maintained at about 0.15 mbar). After freeze-drying, each vial contained a powder comprising the supported platinum powder, an indium precursor deposited thereon, and a tungsten or manganese precursor also deposited on the supported platinum powder.

The recovered precursor powders (i.e., chemically-precipitated and freeze-dried) were then subjected to a heat treatment to reduce the precursors to their metallic state, and to alloy the metals with each other and the platinum on the carbon black particles. One particular heat treatment comprised heating the powder in a quartz flow furnace with an atmosphere comprising about 6% $H_2$ and 94% Ar using a temperature profile of room temperature to about 40° C. at a rate of about 5° C./min; holding at about 40° C. for 2 hours; increasing the temperature to about 200° C. at a rate of 5° C./min; holding at about 200° C. for two hours; increasing the temperature at a rate of about 5° C./min to about 700 or 900° C.; holding at a max temperature of about 700 or 900° C. for a duration of about two, seven, or eight hours (indicated in Table F); and cooling down to room temperature.

In order to determine the actual composition of the supported electrocatalyst alloys, the differently prepared alloys (e.g., by composition variation or by heat treatment variation) were subjected to elemental analysis. The target alloy composition and actual composition for the prepared supported electrocatalyst alloys are also set forth in Table F.

TABLE F

| Target Catalyst Composition | Max Alloying Temp for a duration (° C./hrs) | Actual Catalyst Composition | Target Pt loading (wt %) | Measuring Pt loading (wt %) | Log Pt Mass Activity at +0.15 V MMS | Pt Mass Activity at +0.15 V MMS (mA/mg Pt) | Relative performance at +0.15 V MMS | Catalyst Mass Activity at +0.15 V MMS (mA/mg) |
|---|---|---|---|---|---|---|---|---|
| Pt | — | Pt | 37.9 | 37.9 | 2.11 | 128.82 | 1.00 | 48.82 |
| $Pt_{37}In_{36}Fe_{27}$ | 900/2 | $Pt_{42}In_{37}Fe_{21}$ | 29 | 29 | 1.86 | 72.44 | 0.56 | 21.01 |
| $Pt_{37}In_{36}Fe_{27}$ | 700/8 | — | 29 | — | — | — | — | 19.61 |
| $Pt_{37}In_{18}Fe_{41}Mn_4$ | 700/8 | $Pt_{39}In_{22}Fe_{33}Mn_6$ | 30 | 28.7 | 2.27 | 185.88 | 1.44 | 53.35 |
| $Pt_{37}In_{18}Fe_{41}Mn_4$ | 900/2 | — | 30 | — | — | — | — | 7.54 |
| $Pt_{21}In_8W_{71}$ | 900/2 | $Pt_{54}In_{25}W_{21}$ | 16.5 | 33 | 2.2 | 158.12 | 1.23 | 52.18 |
| $Pt_{21}In_8W_{71}$ | 700/8 | $Pt_{56}In_{24}W_{20}$ | 16.5 | 31 | 2.04 | 111.20 | 0.86 | 34.47 |
| $Pt_{21}In_8W_{71}$ | 700/7 | — | 11.5 | — | — | — | — | 25.16 |
| $Pt_{21}In_8W_{71}$ | 900/2 | — | 11.5 | — | — | — | — | 13.75 |
| $Pt_{50}In_{30}Mn_{20}$ | 700/7 | — | 17.6 | — | — | — | — | 9.31 |
| $Pt_{50}In_{30}Mn_{20}$ | 900/2 | — | 17.6 | — | — | — | — | 28.84 |

EXAMPLE 4

Evaluating the Electrocatalytic Activity of Supported Electrocatalysts

The supported alloy electrocatalysts set forth in Table F and formed according to Example 3 were subjected to electrochemical measurements to evaluate their activities. For the evaluation, the supported alloy electrocatalysts were applied to a rotating disk electrode (RDE) as is commonly used in the art (see, Rotating disk electrode measurements on the CO tolerance of a high-surface area Pt/Vulcan carbon fuel cell electrocatalyst, Schmidt et al., Journal of the Electrochemical Society (1999), 146(4), 1296-1304; and Characterization of high-surface-area electrocatalysts using a rotating disk electrode configuration, Schmidt et al., Journal of the Electrochemical Society (1998), 145(7), 2354-2358). Rotating disk electrodes are a relatively fast and simple screening tool for evaluating supported electrocatalysts with respect to their intrinsic electrolytic activity for oxygen reduction (e.g., the cathodic reaction of a fuel cell).

The rotating disk electrodes were prepared by depositing an aqueous-based ink that comprises the support electrocatalyst and a NAFION solution on a glassy carbon disk. The concentration of electrocatalyst powder in the NAFION solution was about 1 mg/ml. The NAFION solution comprised the perfluorinated ion-exchange resin, lower aliphatic alcohols and water, wherein the concentration of resin is about 5 percent by weight. The NAFION solution is commercially available from the ALDRICH catalog as product number 27, 470-4. The glassy carbon electrodes were 5 mm in diameter and were polished to a mirror finish. Glassy carbon electrodes are commercially available, for example, from Pine Instrument Company of Grove City, Pa. For each electrode, an aliquot of 10 μL electrocatalyst suspension was added to the carbon substrate and allowed to dry at a temperature between about 60 and 70° C. The resulting layer of NAFION and electrocatalyst was less than about 0.2 μm thick. This method produced slightly different platinum loadings for each electrode made with a particular suspension, but the variation was determined to be less than about 10 percent by weight.

After being dried, each rotating disk electrode was immersed into an electrochemical cell comprising an aqueous 0.5 M $H_2SO_4$ electrolyte solution maintained at room temperature. Before performing any measurements, the electrochemical cell was purged of oxygen by bubbling argon through the electrolyte for about 20 minutes. All measurements were taken while rotating the electrode at about 2000 rpm, and the measured current densities were normalized either to the glassy carbon substrate area or to the platinum loading on the electrode. Two groups of tests were performed to screen the activity of the supported electrocatalysts. The first group of tests comprised cyclic voltammetric measurements while purging the electrolyte with argon. Specifically, the first group comprised:
  a. two consecutive potential sweeps starting from OCP to about +0.35V then to about −0.65V and back to OCP at a rate of about 50 mV/s;
  b. two hundred consecutive potential sweeps starting from OCP to about +0.35V then to about −0.65V and back to OCP at a rate of about 200 mV/s; and
  c. two consecutive potential sweeps starting from OCP to about +0.35V then to about −0.65V and back to OCP at a rate of about 50 mV/s.

The second test comprised purging with oxygen for about 15 minutes followed by a potential sweep test for oxygen reduction while continuing to purge the electrolyte with oxygen. Specifically, potential sweeps from about −0.45 V to +0.35 V were performed at a rate of about 5 mV/s to evaluate the initial activity of the electrocatalyst as a function of potential and to create a geometric current density plot. The electrocatalysts were evaluated by comparing the diffusion corrected activity at 0.15 V. All the foregoing test voltages are with reference to a mercury/mercury sulfate electrode. Also, it is to be noted that the oxygen reduction measurements for a glassy carbon RDE without an electrocatalyst did not show any appreciable activity within the potential window.

The above-described supported electrocatalyst alloy compositions were evaluated in accordance with the above-described method and the results are set forth in Table F. The carbon supported alloy compositions $Pt_{54}In_{25}W_{21}$ and $Pt_{39}In_{22}Fe_{33}Mn_6$ (see, actual catalyst composition column of Table F) exhibited oxygen reduction activities greater than that of carbon supported platinum. The results of the evaluation also indicate, among other things, that it may take numerous iterations to develop a set of parameters for producing the target alloy composition. Also evidenced by the data, is that activity can be adjusted by changes in the processing conditions. For example, despite having compositions which are essentially identical (within the experimental error of the detection method), the $Pt_{56}In_{24}W_{20}$ (900° C.) electrocatalyst had a significantly higher activity than the $Pt_{54}In_{25}W_{21}$ (700° C.) electrocatalyst.

Further, without being held to a particular theory, it is presently believed that differences in activity for similar alloy compositions may be due to several factors such as alloy homogeneity (e.g., an alloy, as defined below, may have regions in which the constituent atoms show a presence or lack of order, i.e., regions of solid solution within an ordered lattice, or some such superstructure), changes in the lattice parameter due to changes in the average size of component atoms, changes in particle size, and changes in crystallographic structure or symmetry. The ramifications of synthesis, structure and symmetry changes are often difficult to predict. For example, in the Pt—Fe system, as the amount of iron added to platinum increases, the lattice of the resulting alloy may be expected to change from a cubic face centered lattice to a tetragonal primitive lattice. Within the Pt—W system, solid solutions have been reported at the composition of PtW, however other structure types unrelated to the cubic face centered lattice have also been described. Solid solutions have also been reported in the Pt—In system, although other structure types exist. Without being held to a particular theory, the possibility exists that as the relative ratio of iron to platinum goes from 0 to 1 a solid solution first occurs, i.e. Fe and Pt mix randomly, within some concentration limits, or under some specific synthesis conditions, and that out of this solid solution an ordered phase may gradually crystallize, e.g. $Pt_3Fe$, only to return to a solid solution (disordered alloy) and again back to an ordered phase as the formula PtFe is achieved. This change may also be accompanied by a change in lattice parameters that may be indicative of the resulting changes in symmetry and the resulting changes in the size of the respective metal constituents. For example, the 12-coordinate metallic radii of platinum and iron are 1.39 Å and 1.26 Å, respectively, and as iron is substituted for platinum, the average metal radius, and consequently the observed lattice parameter may be expected to shrink accordingly. The average radius may thus be used as an indicator of lattice changes as a function of stoichiometry, or alternatively, as an indicator of stoichiometry based on observed diffraction patterns. It should be noted, however, that while average radii may be useful as a general rule, experimental results should be expected to conform only in a general manner because local ordering, significant size disparity between atoms, and other factors may produce values that are inconsistent with expectations.

An interpretation of XRD analyses for the foregoing supported alloys is set forth below. Interpretation of XRD analyses can be subjective, and therefore, the following conclusions are not intended to be limiting.

For the $Pt_{42}In_{37}Fe_{21}$ alloy, the predicted change in the average radius based on the ICP measured stoichiometry was about +5.7% versus platinum. XRD measurements, however, indicated a decrease in average radius compared to platinum. Ordering was apparent in the alloys treated at 700° C. (low temperature alloy) and 900° C. (high temperature alloy). There was a small decrease in the d-spacing of the high temperature alloy compared to the low temperature alloy. Also, the diffracted intensity was greater for the high temperature alloy, perhaps indicating an increase in crystallinity. Based on the observed lattice parameter and ordering, the XRD patterns appear similar to PtFe (tetraferroplatinum). This may indicate that the crystalline phase is not in fact of the same stoichiometry as that measured by ICP. One possible explanation for the difference may be that indium, while present in the solid, is not present in the Pt—Fe alloy responsible for the diffraction pattern. This may explain the unexpected decrease in observed lattice parameter.

For the $Pt_{37}In_{18}Fe_{41}Mn_4$ alloy, The predicted change in the average radius was about −4.5% versus platinum. The low temperature alloy showed a −3% average radius change; however, the peak shape of the low temperature alloy seemed to comprise two phases: a platinum-rich phase and a platinum-poor phase. The high temperature alloy only showed a decrease of about 0.5% and no peak shape irregularities. The XRD pattern for the low temperature alloy seemed to be similar in lattice parameter to PtFe (tetraferroplatinum) and the pattern for the high temperature alloy was similar to $Pt_3Fe$ (isoferroplatinum). Ordering was apparent for both alloys and the high temperature phase appeared to display higher crystallinity based both on the pattern intensity as well as the peak widths.

For the $Pt_{21}In_8W_{71}$ alloy, the predicted change in the average radius was about +5.3% versus platinum. The as-synthesized composition was about $Pt_{54}In_{21}W_{24}$, which resulted in predicted change in the average radius of about +1.8%. The observed XRD data are consistent with the predicted change in the average radius. The low and high temperature alloys (i.e., the 900° C. for two hours and the 700° C. for eight hours) showed less than about a +2% average radius change. The XRD patterns for both alloys seemed to be similar to $Pt_2W$ (platinum tungsten) and/or $Pt_3In$ (yixunite). The patterns are difficult to interpret as the ordering present in $Pt_2W$ and $Pt_3In$ does not result in the same types of changes as for first row transition metal ordered alloys such as $Pt_3Fe$.

For the $Pt_{50}In_{30}W_{20}$ alloy, the predicted change in the average radius was about +1.4% versus platinum. The observed XRD data is consistent with this prediction at +1.5%. Both low and high temperature synthesized alloys appear to display the characteristics of a disordered face centered cubic alloy.

In view of the foregoing, for a particular electrocatalyst composition a determination of the optimum conditions is preferred to produce the highest activity for that particular composition. In fact, for certain electrocatalyst compositions, different structural characteristics may define what exactly is described as a good electrocatalyst. These characteristics may include differences in the composition (as viewed by lattice parameter), crystallinity, crystallographic ordering and/or particle size. These characteristics are not necessarily predictable and may depend on a complex interplay between starting materials, synthesis method, synthesis temperature and composition. For example, the starting materials used to synthesize the alloy may play a role in the activity of the synthesized alloy. Specifically, using something other than a metal nitrate salt solution to supply the metal atoms may result in different activities. Additionally, alternative Pt sources may be employed. Freeze-drying and heat treatment parameters such as atmosphere, time, temperature, etc. may also need to be optimized. This optimization may be compositionally dependent. Additionally, this optimization may involve balancing competing phenomena. For example, increasing the heat treatment temperature is generally known to improve the reduction of a metal salt to a metal, which typically increases activity; but it also tends to increase the size of the electrocatalyst alloy particle and decrease surface area, which decreases electrocatalytic activity.

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

When introducing elements of the present invention or an embodiment thereof, the articles "a", "an", "the" and "said" are intended to mean that there are one or more of the elements. The terms "comprising", "including" and "having" are intended to be inclusive and mean that there may be additional elements other than the listed elements.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. A catalyst for use in oxidation or reduction reactions, the catalyst comprising platinum in a concentration between about 5 and about 65 atomic percent, indium in a concentration between about 5 and about 80 percent, and at least one of tungsten, iron, and manganese wherein tungsten, iron, manganese, or a combination thereof is at a concentration that is between about 10 and about 85 atomic percent.

2. The catalyst of claim 1 wherein indium is at a concentration that is between about 5 and about 50 atomic percent.

3. The catalyst of claim 1 wherein platinum is at a concentration that is between about 5 and about 60 atomic percent, and indium is at a concentration that is between about 5 and about 50 atomic percent.

4. The catalyst of claim 1 wherein platinum is at a concentration that is between about 10 and about 50 atomic percent, indium is at a concentration that is between about 10 and about 40 atomic percent, and tungsten, iron, manganese, or a combination thereof is at a concentration that is between about 20 and about 70 atomic percent.

5. The catalyst of claim 1 wherein platinum is at a concentration that is between about 10 and about 30 atomic percent, indium is at a concentration that is between about 5 and about 30 atomic percent, and tungsten is present in the catalyst at a concentration that is between about 40 and about 80 atomic percent.

6. The catalyst of claim 1 wherein platinum is at a concentration that is between about 50 and about 60 atomic percent, indium is at a concentration that is between about 20 and about 30 atomic percent, and tungsten is present in the catalyst at a concentration that is between about 15 and about 25 atomic percent.

7. The catalyst of claim 1 wherein platinum is at a concentration that is between about 25 and about 65 atomic percent, indium is at a concentration that is between about 5 and about 50 atomic percent, and iron is at a concentration that is between about 10 and about 60 atomic percent.

8. The catalyst of claim 1 wherein platinum is at a concentration that is between about 30 and about 50 atomic percent, indium is at a concentration that is between about 15 and about 45 atomic percent, and iron is present in the catalyst at a concentration that is between about 15 and about 50 atomic percent.

9. The catalyst of claim 1 wherein platinum is at a concentration that is between about 45 and about 55 atomic percent, indium is at a concentration that is between about 20 and about 30 atomic percent, and iron is present in the catalyst at a concentration that is between about 20 and about 30 atomic percent.

10. The catalyst of claim 1 wherein platinum is at a concentration that is between about 10 and about 50 atomic percent, indium is at a concentration that is between about 5 and about 30 atomic percent, iron is present in the catalyst at a concentration that is between about 15 and about 80 atomic percent, and manganese is present in the catalyst at a concentration that is between about 1 and about 15 atomic percent.

11. The catalyst of claim 1 wherein platinum is at a concentration that is between about 30 and about 45 atomic percent, indium is at a concentration that is between about 15 and about 30 atomic percent, iron is present in the catalyst at a concentration that is between about 20 and about 45 atomic percent, and manganese is present in the catalyst at a concentration that is between about 3 and about 12 atomic percent.

12. The catalyst of claim 1 wherein platinum is at a concentration that is between about 10 and about 50 atomic percent, indium is at a concentration that is between about 10 and about 80 atomic percent, and manganese is present in the catalyst at a concentration that is no more than about 60 atomic percent.

13. The catalyst of claim 1 wherein platinum is at a concentration that is between about 20 and about 40 atomic percent, indium is at a concentration that is between about 40 and about 70 atomic percent, and manganese is present in the catalyst at a concentration that is between about 5 and about 40 atomic percent.

14. The catalyst of claim 1 wherein platinum is at a concentration that is between about 25 and about 35 atomic percent, indium is at a concentration that is between about 50 and about 70 atomic percent, and manganese is present in the catalyst at a concentration that is between about 10 and about 30 atomic percent.

15. The catalyst of claim 1 wherein platinum is at a concentration that is between about 25 and about 65 atomic percent, indium is at a concentration that is no more than about 55 atomic percent, tungsten is present in the catalyst at a concentration that is no more than about 40 atomic percent, and manganese is present in the catalyst at a concentration that is no more than about 40 atomic percent.

16. The catalyst of claim 1 wherein platinum is at a concentration that is between about 35 and about 55 atomic percent, indium is at a concentration that is between about 10 and about 40 atomic percent, tungsten is present in the catalyst at a concentration that is between about 10 and about 30 atomic percent, and manganese is present in the catalyst at a concentration that is between about 10 and about 30 atomic percent.

* * * * *